(12) United States Patent
Ioki et al.

(10) Patent No.: US 7,804,549 B2
(45) Date of Patent: Sep. 28, 2010

(54) IMAGE DISPLAY SYSTEM AND LIGHT SOURCE UNIT

(75) Inventors: Sadao Ioki, Kiryu (JP); Sanji Arisawa, Joetsu (JP); Seijiro Tomita, Komae (JP)

(73) Assignees: Sophia Inc., Gunma (JP); Arisawa Mfg. Co., Ltd., Niigata (JP); Amita Technologies Inc., Tokyo (JP)

( * ) Notice: Subject to any disclaimer, the term of this patent is extended or adjusted under 35 U.S.C. 154(b) by 1015 days.

(21) Appl. No.: 10/549,810

(22) PCT Filed: Mar. 10, 2004

(86) PCT No.: PCT/JP2004/003139

§ 371 (c)(1),
(2), (4) Date: Sep. 19, 2005

(87) PCT Pub. No.: WO2004/083937

PCT Pub. Date: Sep. 30, 2004

(65) Prior Publication Data

US 2006/0221270 A1    Oct. 5, 2006

(30) Foreign Application Priority Data

Mar. 20, 2003   (JP)   ............................. 2003-078493

(51) Int. Cl.
G02F 1/1335    (2006.01)
(52) U.S. Cl. .......................................................... 349/5
(58) Field of Classification Search .................... 349/15, 349/61–71
See application file for complete search history.

(56) References Cited

U.S. PATENT DOCUMENTS

| | | | |
|---|---|---|---|
| 6,014,164 A | 1/2000 | Woodgate et al. | |
| 6,061,489 A | 5/2000 | Ezra et al. | |
| 6,801,263 B2 * | 10/2004 | Sato et al. | 349/15 |
| 6,864,862 B2 * | 3/2005 | Sato et al. | 345/32 |
| 6,871,982 B2 * | 3/2005 | Holman et al. | 362/331 |
| 2001/0019378 A1 * | 9/2001 | Yamaguchi | 349/61 |
| 2003/0048237 A1 | 3/2003 | Sato et al. | |
| 2004/0130884 A1 * | 7/2004 | Yoo et al. | 362/31 |

FOREIGN PATENT DOCUMENTS

| | | |
|---|---|---|
| EP | 0 656 555 A1 | 6/1995 |
| JP | 52-98385 U | 7/1977 |

(Continued)

*Primary Examiner*—Timothy Rude
(74) *Attorney, Agent, or Firm*—Sughrue Mion, PLLC

(57) ABSTRACT

The present invention provides an image display system that secures a bright image and reduces cross-talk of a three-dimensional image display of a liquid-crystal type and provides a large viewing angle. The image display system includes a filter having a first area for transmitting light of a specific polarization and a second area for transmitting a light of polarization axis orthogonal to the light of the specific polarization provided repeatedly in the vertical direction, and a light source (201) including a light-emitting source (210), a polarizer (212) for emitting the light in the forms of the light having the specific polarization and the light having the polarization axis orthogonal to the specific polarization, and an optical element (203) for refracting the lights having the different polarizations into the directions toward the left and right eyes respectively and irradiating the same onto a liquid crystal panel (205).

11 Claims, 19 Drawing Sheets

FOREIGN PATENT DOCUMENTS

| | | |
|---|---|---|
| JP | 07-218865 | 8/1995 |
| JP | 8-98214 A | 4/1996 |
| JP | 08-211334 | 8/1996 |
| JP | 10-063199 A | 3/1998 |
| WO | WO 01/59508 A1 | 2/2001 |
| WO | WO01/59508 * 8/2001 | .................. 345/32 |

* cited by examiner

IMAGE DISPLAY SYSTEM AND LIGHT SOURCE UNIT

TECHNICAL FIELD

The present invention relates to a light source unit for a liquid crystal type image display system and an image display system.

BACKGROUND ART

Hitherto, a three-dimensional image display system has a configuration such that a polarizing filter part for the right eye and a polarizing filter part for the left eye having the polarization directions intersecting orthogonally with each other are arranged on the left and right of the front surface of a light source, the respective light rays past respective polarizing filter parts are made into parallel beams by a Fresnel lens, and irradiated on liquid crystal display devices, each linear polarizing filter line of the polarizing filters on either side of the liquid crystal display device has a polarization direction orthogonal to both polarization directions of an adjacent filter line, and corresponding polarizing filter line of the other side polarizing filter, whereby the video information for the right eye and the left eye is alternately displayed by each of the one horizontal line in compliance with the light transmission lines of the two polarizing filters on liquid crystal panels of the liquid crystal display devices. Also, each linear polarizing filter line of the polarization filter on the light source side has a polarization direction orthogonal to the polarization direction of an adjacent filter line, and the polarization filter on the observation side is adapted to be a linear polarization filter which has one of the linear polarizing filter line parts on the polarizing filter on the light source side, whereby the video information for the right eye and the left eye is alternately displayed by each of the one horizontal line in compliance with the light transmission lines of the polarizing filters on the light source side on the liquid crystal panels of the liquid crystal display devices (for example, Patent Document 1).

[Patent Document 1]
JP-A-10-63199

However, in the image display system of the related art described above, since a lot of polarizing filters and the like are provided and the light source is so called point light source in which the light source is disposed only at the center behind the liquid crystal panel, there arises a problem in brightness of images. Also, while the light ray from the light source is converted into the parallel light for the left eye and the parallel light for the right eye via the Fresnel lens, there exists crosstalk where these lights are overlapped, and the three-dimensional images cannot be recognized easily correspondingly. There is also a problem such that the viewing angle in the lateral direction is small.

DISCLOSURE OF THE INVENTION

The present invention is intended to provide a light source unit and an image display system in which the above-described problems are solved.

A first aspect of the invention is an image display system including: a liquid crystal display panel which can transmit light irradiated from behind; a light source for irradiating a light having a specific polarization and a light having a polarization axis orthogonal to the specific polarization onto the liquid crystal display panel, a filter disposed between the liquid crystal display panel and the light source and includes first areas for transmitting the light having the specific polarization and second areas for transmitting the light having the polarization axis orthogonal to the specific polarization disposed repeatedly in the vertical direction; the light source including a light-emitting source for emitting light which has no specific polarization, polarizing means for turning the light which has no specific polarization into the forms of the light having the specific polarization and the light having the polarization in which the polarization axis is orthogonal to the polarization axis of the specific polarization to output the lights, optical means for refracting the lights having the different polarizations into the directions toward the left and right eyes respectively and irradiating the same onto the liquid crystal panel, characterized in that the light-emitting source is a linear light-emitting source which is disposed in the lateral direction with respect to the liquid crystal display panel so that a light source member for displaying three-dimensional images comes to the center and light source members for enlarging viewing angle come to both sides, the linear light-emitting source includes center prisms which increase brightness by narrowing the irradiating range of the linear light-emitting source at the center portion of the linear light-emitting source, and peripheral prisms having a different brightness from the center prisms disposed at both ends of the linear light-emitting source.

In the first aspect of the invention, a second aspect of the invention is configured in such a manner that the linear light-emitting source includes linearly disposed plurality of point light-emitting sources, and the center prisms and the peripheral prisms each includes a light-inputting surface which allows light from the point light-emitting sources to enter and a light-outputting surface which outputs light entered from the light-inputting surface and then corrected in the optical path, which are disposed in one-to-one relation with respect to the respective point light-emitting sources.

In the second aspect of the invention, a third aspect of the invention is configured in such a manner that the light-outputting surfaces of the center prisms and the peripheral prisms are arranged without gap therebetween.

In the second aspect of the invention, a fourth aspect of the invention is configured in such a manner that the center prisms and the peripheral prisms are disposed in one-to-one relation with respect to the respective point light-emitting sources.

In the second aspect of the invention, a fifth aspect of the invention is configured in such a manner that the center prisms and the peripheral prisms are provided separately for the center portion of the linear light-emitting source and the both ends of the liner light-emitting source, and formed integrally through the peripheral portion of the light outputting surface corresponding to the predetermined number of point light-emitting sources.

In the second to fifth aspects of the invention, a sixth aspect of the invention is configured in such a manner that the point light-emitting sources are arranged at high density at the center portion of the linear light-emitting source and at low density at both end portions of the linear light-emitting source.

In the first to fifth aspects of the invention, a seventh aspect of the invention is configured in such a manner that the center prisms and the peripheral prisms include wedge shaped prisms each having a light-inputting surface facing the point light-emitting sources and a light-outputting surface facing the liquid crystal display panel surface on both ends, and at least one of the opposing side surfaces of the wedge shaped prism with respect to the liquid crystal display panel is formed into a curved surface.

In the sixth aspect of the invention, an eighth aspect of the invention is configured in such a manner that the center prisms and the peripheral prisms include the wedge shaped prisms each having a light-inputting surface facing the point light-emitting sources and a light-outputting surface facing the liquid crystal display panel surface on both ends, and at least one of the opposing side surfaces of the wedge shaped prism with respect to the liquid crystal display panel is formed into a curved surface.

In the seventh aspect of the invention, a ninth aspect of the invention is configured in such a manner that the other side surface of the wedge shaped prism is formed into a flat plane.

In the eighth aspect of the invention, a tenth aspect of the invention is configured in such a manner that the other side surface of the wedge shaped prism is formed into a flat plane.

In the first to fifth aspects of the invention, an eleventh aspect of the invention is configured in such a manner that the light-outputting surfaces of the center prisms and the light-outputting surfaces of the peripheral prisms are positioned at substantially a uniform distance toward the center portion of the liquid crystal display panel.

In the sixth aspect of the invention, a twelfth aspect of the invention is configured in such a manner that the light-outputting surfaces of the center prisms and the peripheral prisms are positioned at substantially a uniform distance toward the center of the liquid crystal display panel.

A thirteenth aspect of the invention is a light source unit including a light source member for observation from the front at a center portion and light source members for enlarging the viewing angle at both end portions for emitting light linearly and irradiating on a liquid crystal display panel from behind via optical means which refracts and irradiates light onto the liquid crystal display panel, configured in such a manner that the center prisms for narrowing an irradiating range of the linear light-emitting source to increase the brightness are disposed at the center portion of the linear light-emitting source, and peripheral prisms having a brightness different from the center prisms are disposed on both end portions of the linear light-emitting source.

According to the first aspect of the invention, a linear light-emitting source is disposed in the lateral direction with respect to the liquid crystal display panel so that a light source member for displaying three-dimensional images comes to the center portion and light source members for enlarging viewing angle come to both end portions, center prisms which increase brightness by narrowing the irradiating range of the linear light-emitting source are disposed at the center portion of the linear light-emitting source, and peripheral prisms each having a different brightness from the center prisms disposed at both end portions of the linear light-emitting source. Therefore, a limited quantity of light can be used effectively for displaying the three-dimensional images and for enlarging the viewing angle. Therefore, the center portion of the display screen which enables three-dimensional view is increased in brightness, and the lateral viewing angle can be increased while reducing the cost for securing the light source and a quantity of heat generation from the light source.

According to the second aspect of the invention, the linear light-emitting source includes linearly disposed plurality of point light-emitting sources, and the center prisms and the peripheral prisms each includes a light-inputting surface which allows light from the point light-emitting sources to enter and a light-outputting surface which outputs light entered from the light-inputting surface and then corrected in the optical path, which are disposed in one-to-one relation with respect to the respective point light-emitting sources. Therefore, lights from the point light-emitting source can be caused to enter preferably and to be emitted preferably onto the liquid crystal display panel surface.

According to the third aspect of the invention, since the light-outputting surfaces of the center prisms and the peripheral prisms are arranged without gap therebetween, generation of a shadow on the screen due to the gap is prevented.

According to the fourth aspect of the invention, since the center prism and the peripheral prisms are disposed in one-to-one relation with respect to the respective point light-emitting sources, loss of entered light before emission can be reduced.

According to the fifth aspect of the invention, since the center prisms and the peripheral prisms are provided separately for the center portion of the linear light-emitting source and the both end portions of the linear light-emitting source, and formed integrally through the peripheral portion of the light outputting surface corresponding to the predetermined number of point light-emitting sources, assembleability of the prism can be improved while reducing loss of the entered light before emission.

According to the sixth aspect of the invention, since the point light-emitting sources are arranged at high density at the center portion of the linear light-emitting source and at low density at both end portions of the linear light-emitting source, reduction of the quantity of heat generation by reduction of the number of point light-emitting sources and the cost reduction are achieved. Also, concentration of the heat-generating points can be avoided.

According to the seventh and eighth aspects of the invention, since the center prisms and the peripheral prisms include wedge shaped prisms each having a light-inputting surface facing the point light-emitting sources and a light-outputting surface facing the liquid crystal display panel surface on both ends, and at least one of the opposing side surfaces of the wedge shaped prism with respect to the liquid crystal display panel is formed into a curved surface, the range of angle in which the outgoing light diffuses with respect to the liquid crystal display panel and the distribution of the intensity of luminous flux can be preferably controlled.

According to the ninth and tenth aspects of the invention, since the other side surface of the wedge shaped prism is formed into a flat plane, diffusion of outgoing light with respect to the liquid crystal display panel is allowed and the viewing angle in this direction can be enlarged. Also, by employing the flat plane, easy machining and easy mirror polishing for causing the light ray to reflect therefrom are achieved.

According to the eleventh and twelfth aspects of the invention, since the light-outputting surfaces of the center prisms and the light-outputting surfaces of the peripheral prisms are positioned at substantially a uniform distance to the center portion of the liquid crystal display panel, the light-source members may be disposed at a low density while disposing the light-outputting surfaces at a high density whereby concentration of the heat generating portions may be prevented. Also, arrangement of the light source members may be facilitated.

The thirteenth aspect of the invention is a light source unit including a light source member for observation from the front at a center portion and light source members for enlarging the viewing angle at both end portions for emitting light linearly and irradiating on a liquid crystal display panel from behind via optical means which refracts and irradiates light onto the liquid crystal display panel, configured in such a manner that the center prisms for narrowing an irradiating range of the linear light-emitting source to increase the brightness are disposed at the center portion of the linear light-emitting source, and peripheral prisms having a brightness different from the center prisms are disposed on both end portions of the linear light-emitting source. Therefore, a limited quantity of light can be used effectively for observation from the front and for observation from the side. Therefore, the brightness of the center portion of the display screen is increased, and the lateral viewing angle can be enlarged while reducing the cost for securing the light source and the quantity of heat generation from the light source.

BEST MODE FOR CARRYING OUT THE INVENTION

Figure 1:
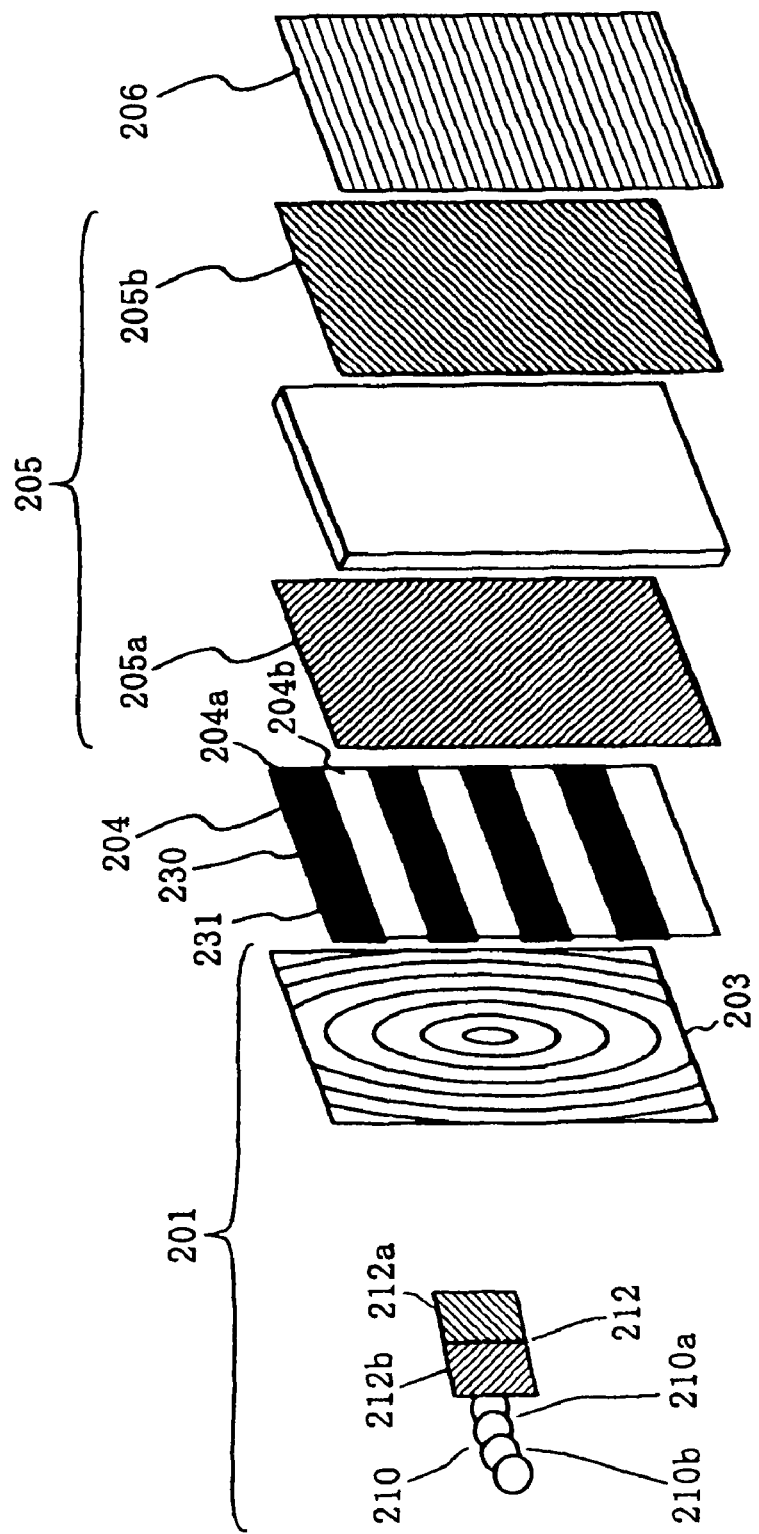
FIG. 1 is an explanatory drawing showing functions of an image display system according to an embodiment of the present invention.

Referring now to the drawings, an embodiment of the present invention will be described.

FIG. 1 is an explanatory drawing showing functions of an image display system according to an embodiment of the present invention.

A light source 201 includes a light-emitting source 210, a polarizing filter 212 (polarizing means), and a Fresnel lens 203 (optical means). The light-emitting source 210 used here includes white light-emitting diodes or the like (or cold cathode tubes or the like) disposed in the lateral direction. The polarizing filter 212 includes a right area 212a and a left area 212b which are set to provide different polarizations of transmitting lights (for example, to shift polarization of transmitting lights between the right area 212a and the left area 212b by 90 degrees). The Fresnel lens 203 has a lens surface having projections and depression concentrically on one side.

Only part of a light emitted from the light-emitting source 210, having predetermined polarizations can be transmitted through the polarizing filter 212. In other words, out of light emitted from the light-emitting source 210, a light passed through the right area 212a of the polarizing filter 212 and a light passed through the left area 212b thereof are irradiated on the Fresnel lens 203 as lights having different polarizations. As will be described later, the light passed through the right area 212a of the polarizing filter 212 reaches the left eye of a viewer, and the light passed through the left area 212b reaches the right eye of the viewer.

The lights transmitted through the polarizing filter 212 are irradiated on the Fresnel lens 203. The Fresnel lens 203 is a convex lens, and converts an optical path of the light emitted from the light-emitting source 210 in a diffusing manner into substantially converged lights, then allows the same to pass through a micro-patterned retarder 204 and then to be irradiated onto a liquid crystal display panel 205.

At this time, the light irradiated from the micro-patterned retarder 204 is emitted so as not to diffuse in the vertical direction, and is irradiated on the liquid crystal display panel 205. In other words, the light transmitted through a specific area of the micro-patterned retarder 204 is transmitted through a portion of the liquid crystal display panel 205 having a specific unit of display.

Regarding lights irradiated to the liquid crystal display panel 205, the light passed through the right area 212a of the polarizing filter 212 and the light passed through the left area 212b thereof enters the Fresnel lens 203 at different angles, are refracted in the Fresnel lens 203, and are emitted from the liquid crystal display panel 205 along different routes on the right side and the left side.

The liquid crystal display panel 205 is filled with liquid crystal oriented so as to be twisted at a predetermined angle (for example, 90 degrees) between two glass plates, and constitutes, for example, a TN (Twist Nematic) type liquid crystal display panel. The incident light which enters the liquid crystal display panel is emitted at a polarization shifted by 90 degrees in a state in which no voltage is applied to the liquid crystal. On the other hand, when a voltage is applied to the liquid crystal, twisting of the liquid crystal is released, and the incident light is emitted at the unchanged polarization.

The micro-patterned retarder 204 and a polarizer 205a (second polarizer) are disposed on the side of the light source 201 of the liquid crystal display panel 205 (a combination of the micro-patterned retarder 204 and the polarizer 205a (second polarizer) is referred to as a filter), and a polarizer 205b (first polarizer) is disposed on the viewer side.

The micro-patterned retarder 204 includes areas which change the phase of light ray transmitting therethrough disposed at fine intervals repeatedly. More specifically, a light transmitting base material 230 has areas 204a each provided with a half wave retarder 231 of a minute width, and areas 204b each having the same minute interval as the width of the half wave retarder 231 and not including the half wave retarder 231 arranged at minute intervals repeatedly. In other words, the areas 204a which change the phase of light ray transmitting therethrough by the half wave retarders 231 provided and the areas 204b which do not change the phase of light ray transmitting therethrough since the half wave retarders 231 are not provided are arranged repeatedly at minute intervals. The half wave retarders 231 function as the retarders which change the phase of light ray transmitting therethrough.

The half wave retarder 231 is disposed so that the optical axis thereof is inclined by 45 degrees with respect to a polarization axis of the light transmitting through the right area 212a of the polarizing filter 212, thereby emitting the light transmitted through the right area 212a with its polarization axis rotated by 90 degrees.

In other words, polarization of the light transmitted through the right area 212a is rotated by 90 degrees to equalize to that of the light transmitting through the left area 212b. In other words, the areas 204b where the half wave retarders 231 are not provided allow lights passed through the left area 212b and having the same polarization as the polarizer 205a to be transmitted therethrough. The areas 204a where the half wave retarders 231 are provided cause the light passed through the right area 212a and having the polarization axis orthogonal to the polarizer 205a to be rotated so as to equalize the polarization axis thereof to that of the polarizer 205a before emission.

Repetition of the polarization characteristics of the micro-patterned retarder 204 is adapted to have substantially the same pitch as the unit of display of the liquid crystal display panel 205 to differentiate polarization of the lights transmitted therethrough by each unit of display (that is, by each lateral horizontal line of the unit of display). Therefore, the polarization characteristics of the micro-patterned retarder are differentiated for each of the corresponding horizontal lines (scanning line) as the unit of display of the liquid crystal display panel 205, whereby the directions of lights emitted from the respective horizontal lines are different.

Alternatively, repetition of the polarization characteristics of the micro-patterned retarder 204 is set to have a pitch which is integral multiple of the pitch of the unit of display of the liquid crystal display panel 504, so that the polarization characteristics are differentiated for each set of a plurality of units of display on the micro-patterned retarder 204 (that is, for each set of the plurality of horizontal lines as the unit of display), thereby differentiating the polarization of the lights transmitted therethrough for each set of the plurality of units of display. In this case, the polarization characteristics of the micro-patterned retarder are different for each set of the plurality of horizontal lines as the unit of display (scanning lines) of the liquid crystal display panel 504, and hence the directions of the emitted lights are different for each set of the plurality of horizontal lines.

In this manner, since it is necessary to irradiate different lights onto the display devices of the liquid crystal display panel 205 (horizontal lines) for each repeated polarization characteristics of the micro-patterned retarder, the lights to be irradiated on the liquid crystal display panel 205 after having transmitted through the micro-patterned retarder 204 must be vertical diffusion controlled lights.

In other words, the areas 204a of the micro-patterned retarder 204 for changing the phase of the light equalize the light-having transmitted through the right area 212a of the polarizing filter 212 with polarization of lights having transmitted through the left area 212b upon transmission. On the other hand, the areas 204b of the micro-patterned retarder 204 which do not change the phase of the light allow the light having transmitted through the left area 212b of the polarizing filter 212 to be transmitted as is. Then, the lights emitted from the micro-patterned retarder 204, having the same polarizations as the light transmitted through the left area 212b, enter the polarizer 205a provided on the light source side of the liquid crystal display panel 205.

The polarizer 205a functions as the second polarizer, and has such polarization characteristics as to allow the light having the same polarization as the light having transmitted through the micro-patterned retarder 204 to be transmitted. In other words, the light having transmitted through the left area 212b of the polarizing filter 212 is transmitted through the second polarizer 205a, and the polarizing axis of the light having transmitted through the right area 212a of the polarizing filter 212 is rotated by 90 degrees before being transmitted through the second polarizer 205a. The polarizer 205b functions as the first polarizer, and has such polarizing characteristics as to allow light having a polarization different from the polarizer 205a by 90 degrees to be transmitted therethrough.

The micro-patterned retarder 204, the polarizer 205a, and the polarizer 205b are bonded together to the liquid crystal display panel 205, and the micro-patterned retarder 204, the polarizer 205a, the liquid crystal display panel 205, and the polarizer 205b are combined to constitute the image display system. At this time, in a state in which a voltage is applied to the liquid crystal, the light having transmitted through the micro-patterned retarder 204 is transmitted through the polarizer 205b. On the other hand, in a state in which no voltage is applied to the liquid crystal, the light having transmitted through the micro-patterned retarder 204, whereof the polarization is twisted by 90 degrees, is emitted from the liquid crystal display panel 205, and hence is not transmitted through the polarizer 205b.

A diffuser 206 is mounted to the front side (viewer side) of the first polarizer 205b, and functions as diffusing means for diffusing the light having transmitted through the liquid crystal display panel in the vertical direction. More specifically, it diffuses light having transmitted through the liquid crystal display panel in the vertical direction using a lenticular lens having projections and depressions of semicircular shape in cross-section provided repeatedly in the vertical direction.

It is also possible to employ a mat-type diffusing surface formed with minute projections and depressions on the surface as diffusing means. The surface is formed with a number of the minute projections of oval or elongated circular shape disposed so that the longer diameter is directed substantially in the horizontal direction and form projections and depressions surface, the minute projections of the mat-type diffusing surface is finished into a laterally collapsed oval shape, whereby light is strongly diffused in the vertical direction. It is also possible to provide the diffusing means on both surfaces of the diffuser so as to diffuse the light in the vertical direction more strongly. In this case, a lenticular lens and the mat-type diffusing surface may be combined as the diffusing means.

Figure 2:
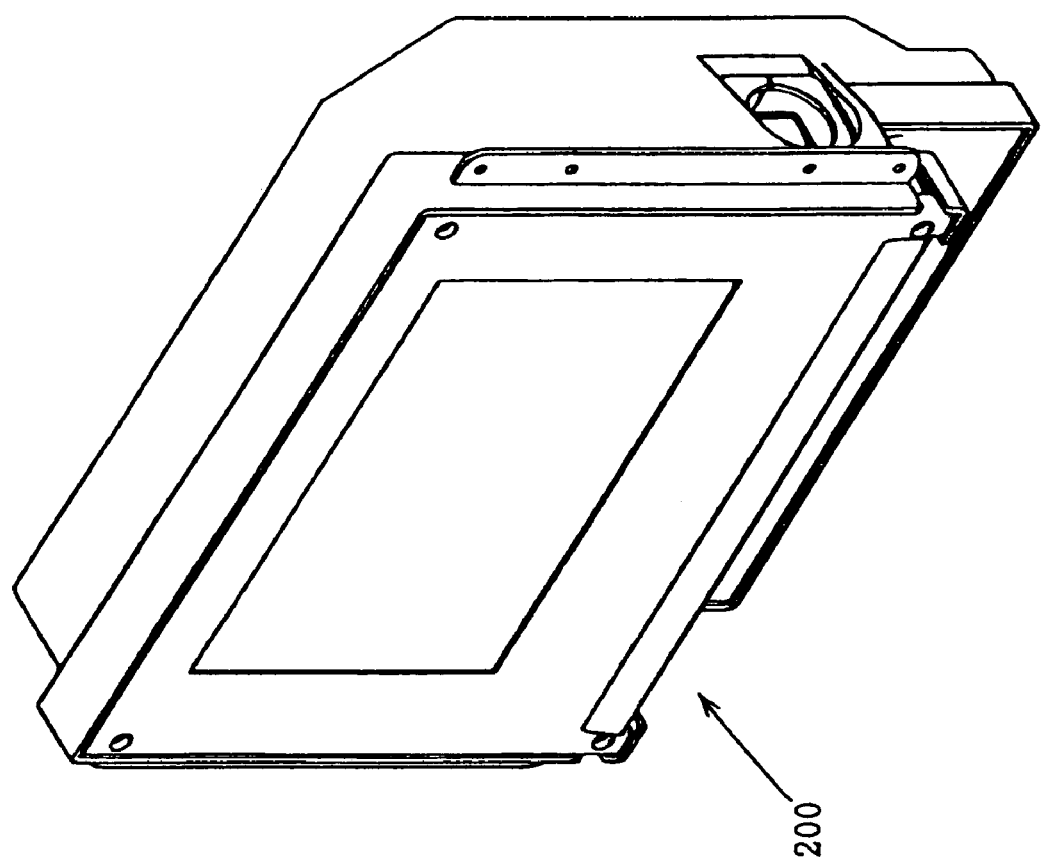
FIG. 2 is a perspective view of the image display system.
Figure 3:
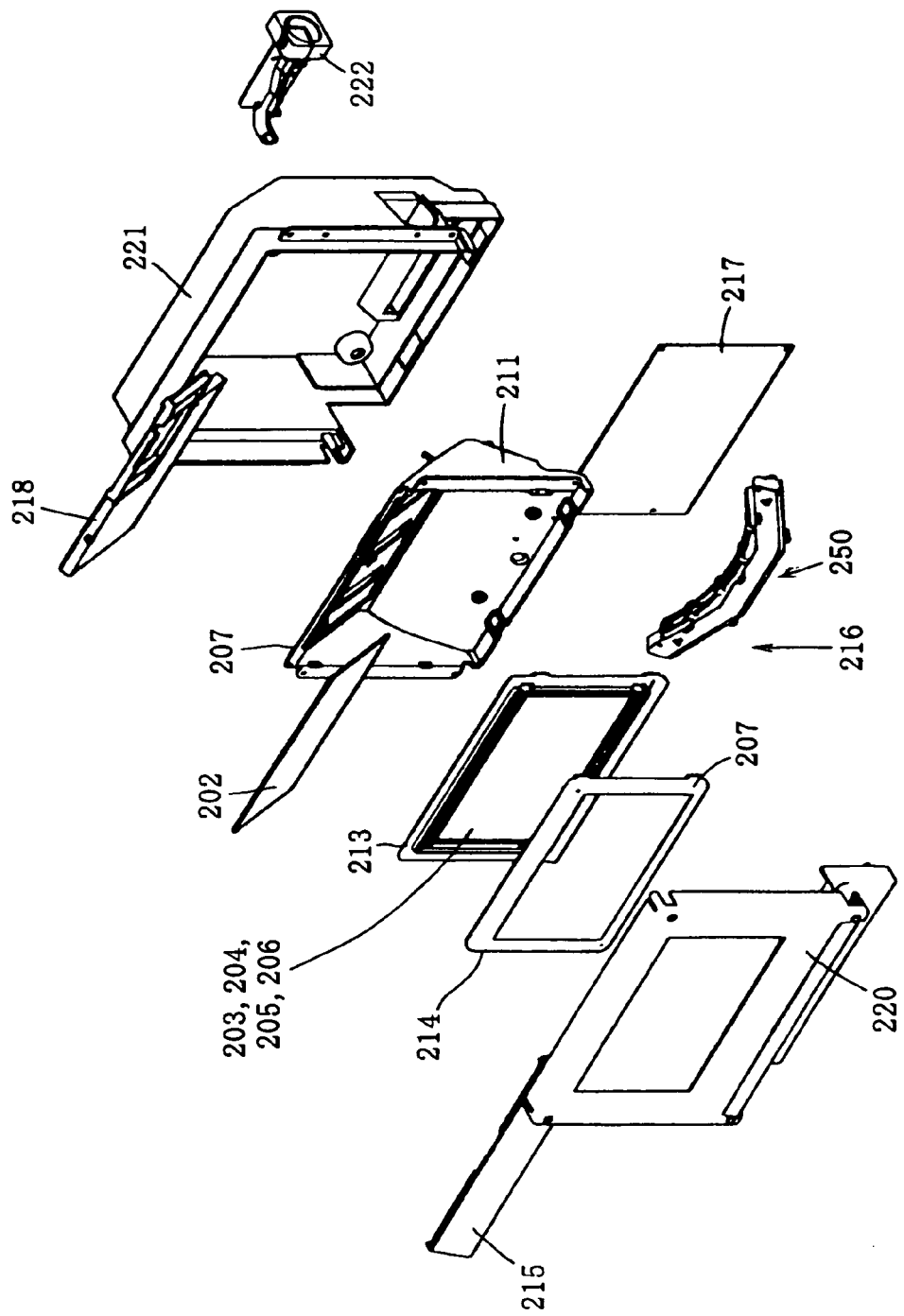
FIG. 3 is an exploded perspective view of the image display system.

FIG. 2 and FIG. 3 are a perspective view and an exploded perspective view of the image display system according to the embodiment of the present invention.

An image display system 200 includes a light source body unit 250 having the light-emitting source (linear light-emitting source) 210 disposed in a holder 208 of a predetermined shape, a reflecting plate (mirror) 202, the Fresnel lens 203, the micro-patterned retarder 204, the liquid crystal display panel 205, the diffuser 206 and the like are assembled in a case 207.

The light source body unit 250 is mounted to a lower wall of a light source body storage 211 of the case 207 in a rearwardly tilted state so that the linear light-emitting source 210 is disposed in the lateral direction with respect to the liquid crystal display panel 205.

The reflecting plate 202 is mounted to an upper half wall of the light source body storage 211 in an upwardly tilted state so that the light from the linear light-emitting source 210 is irradiated on the Fresnel lens 203.

The linear light-emitting source 210 is disposed in such a manner that the linear light-emitting portions are curved toward the center of the Fresnel lens 203 (so as to be positioned at substantially equal distance), and are positioned at a distance longer than the focal distance thereof (light from the linear light-emitting source 210 and the distance from the center portion of the Fresnel lens 203 are to pass through the reflecting plate 202).

The polarizing filter 212, which converts a light from a right light-emitting portion 210*a* of the linear light-emitting source 210 into a light having a polarization for the left eye, and a light from a left light-emitting portion 210*b* of the same to a light having a polarization for the right eye, is mounted to the front surface of the light source body unit 250 as will be described later.

The Fresnel lens 203, the micro-patterned retarder 204, the liquid crystal display panel 205, and the diffuser 206 are fitted to a panel frame 213 and a cover frame 214 of the case 207, and the panel frame 213 and the cover frame 214 are fixedly assembled in the light source body storage 211. A light source body cover 215 is assembled in the light source body storage 211 at the lower portion of the panel frame 213.

A front cover 220 is mounted to the front surface of a display unit 216, and a circuit board for driving is disposed in substrate holders 217, 218 at the rear portion thereof, and a cover case 221 is mounted. Reference numeral 222 designates an air-cooling fan for the linear light-emitting source 210.

Figure 4:
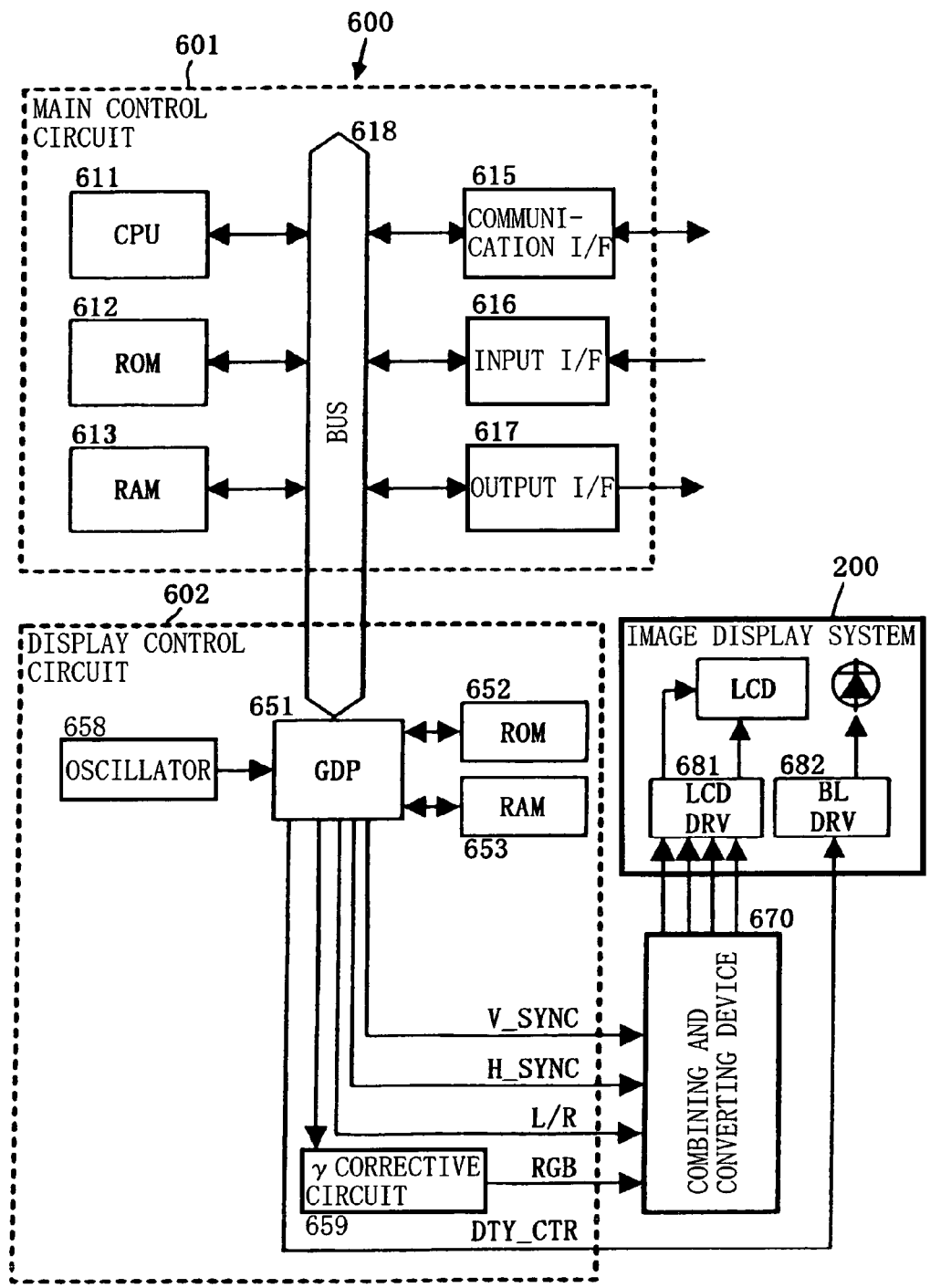
FIG. 4 is a block diagram showing a drive circuit of the image display system.

FIG. 4 is a block diagram showing a drive circuit 600 of the image display system 200.

A main control circuit 601 for driving the image display system includes a CPU 611, a ROM 612 having a program or the like stored therein in advance, and a RAM 613 as a memory used as a work area when the CPU 611 is in operation. The CPU 611, the ROM 612, and the RAM 613 are connected by a bus 618. The bus 618 includes an address bus and a data bus which are used when the CPU 611 reads and writes data.

A communication interface 615, an input interface 616, and an output interface 617, which perform input and output with respect to the outside, are connected to the bus 618. The communication interface 615 is a data input/output section for data communication according to a predetermined communication protocol. The input interface 616 and the output interface 617 input/output image data to be displayed on the image display system.

A graphic display processor (GDP) 651 of a display control circuit 602 is connected to the bus 618. The GDP 651 calculates image data generated by the CPU 611, writes the same to a frame buffer provided in a RAM 653, and generates signals (RGB, V BLANK, V_SYNC, H_SYNC) to be output to the image display system. A ROM 652 and the RAM 653 are connected to the GDP 651, and the RAM 653 is provided with a work area where the GDP 651 operates and the frame buffer for storing the display data. The ROM 652 includes a program and data required for the operation of the GDP 651 stored therein.

The GDP 651 includes an oscillator 658 for supplying a clock signal to the GDP 651 connected thereto. The clock signal generated by the oscillator 658 defines the operating frequency of the GDP 651 and generates a frequency of the synchronized signal output from the GDP 651 (for example, V_SYNC, VBLAMNK).

The RGB signal output from the GDP 651 is input to a γ corrective circuit 659. The γ corrective circuit 659 corrects a non-linear characteristic of illuminance with respect to the signal voltage of the image display system, adjusts the display illuminance of the image display system, and generates the RGB signal output to the image display system.

A combining and converting device 670 is provided with a frame buffer for right-eye, a frame buffer for left-eye and a frame buffer for three-dimensional view, and writes a right-eye image sent from the GDP 651 in the frame buffer for right-eye, a left-eye image to the frame buffer for left-eye. Then, the combining and converting device combines the right-eye image and the left-eye image to generate an image for three-dimensional view, and writes the same in the frame buffer for three-dimensional view, and outputs the image data for three-dimensional view to the image display system as the RGB signal.

Generation of the image for three-dimensional view by combining the right-eye image and the left-eye image is done by combining the right-eye image and the left-eye image according to each interval of the half wave retarders 231 of the micro-patterned retarder 204. More specifically, since the half wave retarders 231 of the micro-patterned retarder 204 of the image display system according to the embodiment of the present embodiment are disposed at intervals of the unit of display of the liquid crystal display panel 205, the image for three-dimensional view is displayed so that the right-eye images and the left-eye images are alternately displayed by each horizontal line (scanning line) as the unit of display of the liquid crystal display panel 205.

The left-eye image data transmitted from the GDP 651 during output of a L signal is written in the frame buffer for left-eye and the right-eye image data transmitted from the GDP 651 during output of a R signal is written in the frame buffer for right-eye. Then, the left-eye image data written in the frame buffer for left-eye and the right-eye image data written in the frame buffer for right-eye are read out for each scanning line and written in the frame buffer for three-dimensional view.

The image display system includes a liquid crystal driver (LCD DRV) 681, and a backlight driver (BL DRV) 682. The liquid crystal driver (LCD DRV) 681 applies a voltage to the electrodes of the liquid crystal display panel in sequence based on the V_SYNC signal, H_SYNC signal, and the RGB signal transmitted from the combining and converting device 670 to display a combined image for three-dimensional view on the liquid crystal display panel.

The backlight driver 682 changes duty ratios of voltage applied to the backlight (light-emitting source 210) based on the DTY_CTR signal output from the GDP 651, thereby changing brightness of the liquid crystal display panel 205.

FIG. 5 to FIG. 8 are a plan view, a side view, an exploded perspective view, and a cross-sectional view of the light source body unit 250. The linear light-emitting source 210 is formed of a plurality of point light-emitting sources arranged linearly (LEDs (light-emitting diodes): white light-emitting diode or the like) or an elongated cold cathode tube or the like, and in this embodiment, the case in which the point light-emitting sources are used will be described.

The holder 208 includes storage cases 301*a*, 301*b* and a cover 302 of separate members which form a storage 300 in the shape of the polygonal line. The storage 300 includes a center portion 303 of a predetermined length, and peripheral portions 304 disposed at both ends thereof and bent at predetermined angles toward the front of the holder.

The linear light-emitting source 210 includes a predetermined number of LEDs (light-emitting diodes: white light-emitting diode or the like) 305 linearly arranged on and attached to a center portion 308*a* of the substrate 308 of a predetermined length, and peripheral portions 308b located at both sides thereof and inclined at a predetermined angle toward the front of the substrate.

The respective LEDs 305 are arranged at smaller intervals (pitch A) on the center portion 308a of the substrate 308, and at larger intervals on the peripheral portions 308b. Among others, in the peripheral portions 308b, the LEDs 305 are disposed at smaller intervals (pitch B) at the portion closer to the center, and at larger intervals (pitch C) on the portion closer to the outer sides thereof. In this manner, the LEDs 305 disposed at a higher density on the center portion 308a which is positioned in front of the viewer in order to increase brightness of the display screen. Then the LEDs 305 on the peripheral portions are intended to improve the viewing angle in the lateral direction, and hence are disposed at a lower density in order to avoid concentration of light generating members at the expense of brightness, and to reduce the cost by reducing the number of the LEDs.

In front of the respective LEDs 305, prisms 306 for providing directivity to the light from the LEDs 305 are arranged in one-to-one relation. The prisms 306 on the center portion are integrally formed as a center prism body 307a and the prisms 306 on the peripheral portions are integrally formed as the peripheral prism body 307b corresponding to the LEDs 305 on the center portion 308a and the LEDs 305 on the peripheral portion 308b, and the light-inputting surfaces (described later) for allowing the lights from the LEDs 305 to enter and the light-outputting surfaces (described later) for outputting lights which are entered from the light-inputting surface and corrected in the optical path are arranged in one-to-one relation with respect to the LEDs 305 respectively.

Since the prisms 306 are provided in one-to-one relation with respect to the respective LEDs 305, the lights entered into the prisms may be output with reduced loss of light. Also, since the light-inputting surfaces and the light-outputting surfaces of the prisms are provided in one-to-one relation with respect to the respective LEDs 305, the lights from the LEDs 305 preferably enter into the prisms and are preferably output toward the liquid crystal panel surface.

While the arrangement intervals of the LEDs 305 are graded into three stages of pitch A, pitch B, and pitch C, the pitch may be varied in two stages or in a plurality of stages more than four. The pitch may be set for each integrated prism, or the pitch may be set into the plurality of stages according to the direction of arrangement of the integrated prisms.

A substrate 308 on which the LEDs 305 are arranged is stored in the storage cases 301a, 301b of the holder 208, and then the center prism body 307a is assembled in the LEDs 305 on the center portion 308a, and the peripheral prism bodies 307b are assembled in the LEDs 305 on the peripheral portions 308b (aligning the light-emitting surfaces of the respective LEDs 305 and the light-inputting surfaces of the respective prisms 306 in one-to-one relation), then the polarizing filters 212 is mounted to the front surfaces of the respective prism bodies 307a, 307b via the cover 302, whereby the light source body unit 250 is completed.

The linear light-emitting source 210 is formed into the shape of a symmetrical polygonal line with the LEDs 305 on the center portion 308a of the substrate 308 as the light source member extending linearly in parallel with the display surface of the liquid crystal display panel 205 for displaying the three-dimensional images and the LEDs 305 on the peripheral portions 308b of the substrate 308 as the light source members at an angle with respect to the display surface of the liquid crystal display panel 205 for enlarging the viewing angle which enlarges the viewing angle in the lateral direction, while the center prism body 307a and the peripheral prism bodies 307b are formed so that the light-outputting surfaces of the prisms are curved toward the center of the liquid crystal display panel 205 (so as to position at substantially uniform distance).

Figure 5:
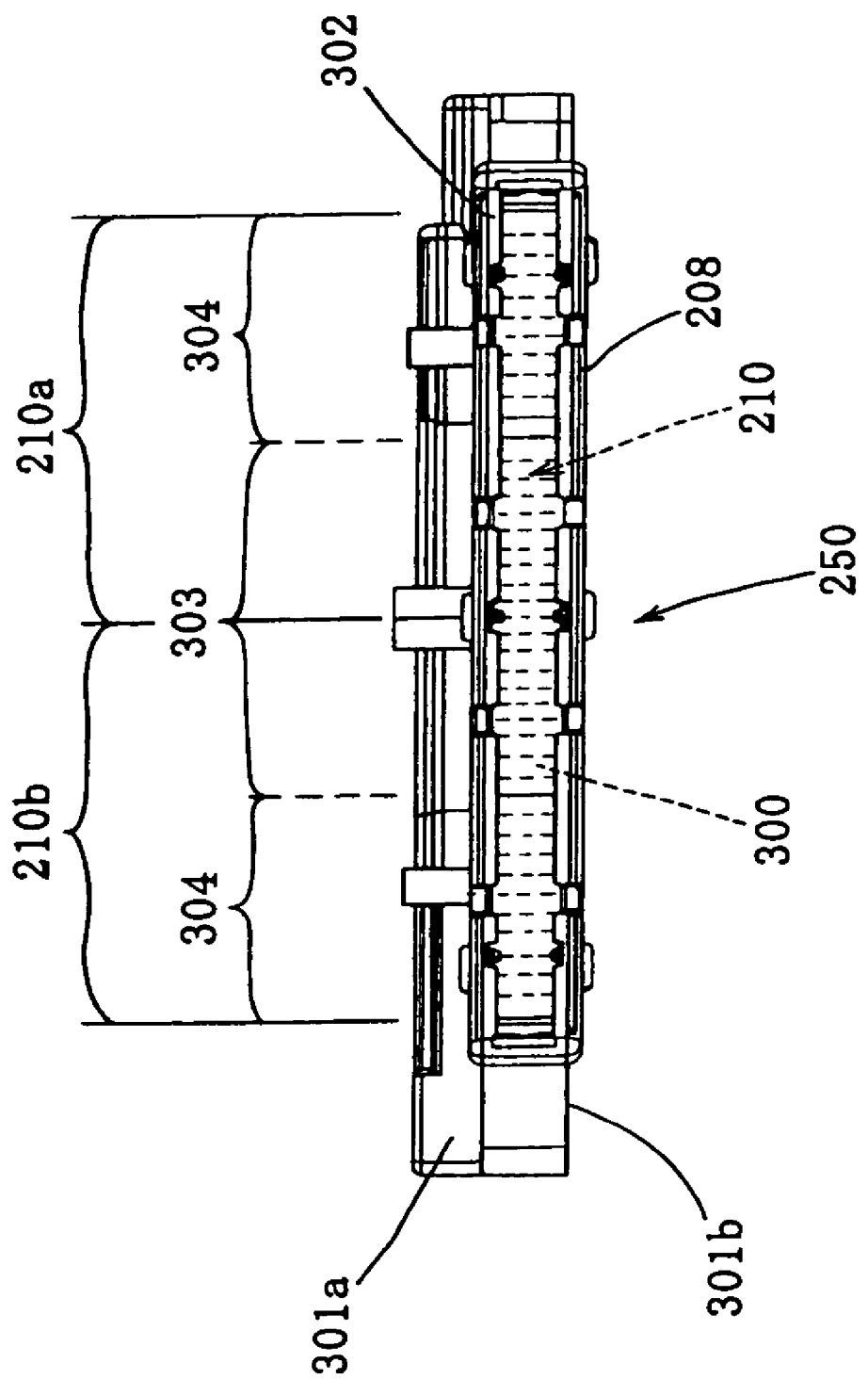
FIG. 5 is a front view of a light source body unit.
Figure 9:
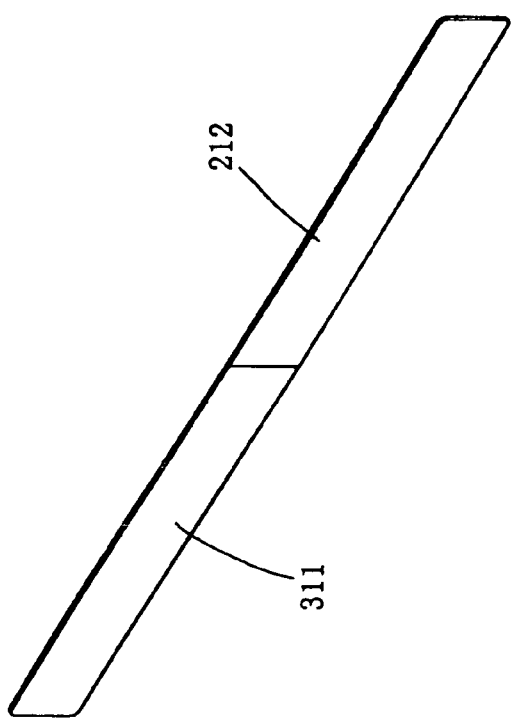
FIG. 9 is a perspective view of a polarizing filter.

The polarizing filter 212 has different characteristics between the right light-emitting portions 210a of the linear light-emitting source 210 and the left light-emitting portions 210b thereof bounded by a center of the linear light-emitting source 210 as shown in FIG. 5. Therefore, when it is difficult to form the boundary between the left and right light-emitting portions 210a, 210b, it is possible to mount the same polarizing filters 212 to the front surfaces of the left and right light-emitting portions 210a, 210b (front surface of the prism bodies 307a, 307b) as shown in FIG. 9, and bond a predetermined retarder 311 on one of them.

Although the linear light-emitting source 210 is formed into a single substrate, it is also possible to divide the substrate into a substrate of the linear center portion 308a, and substrates of the linear peripheral portions 308b, linearly arrange the LEDs 305 on the respective substrates as units, dispose the units of the plurality of linear light-emitting source of the linear shape into the shape of a polygonal line to form the linear light-emitting source 210.

Figure 6:
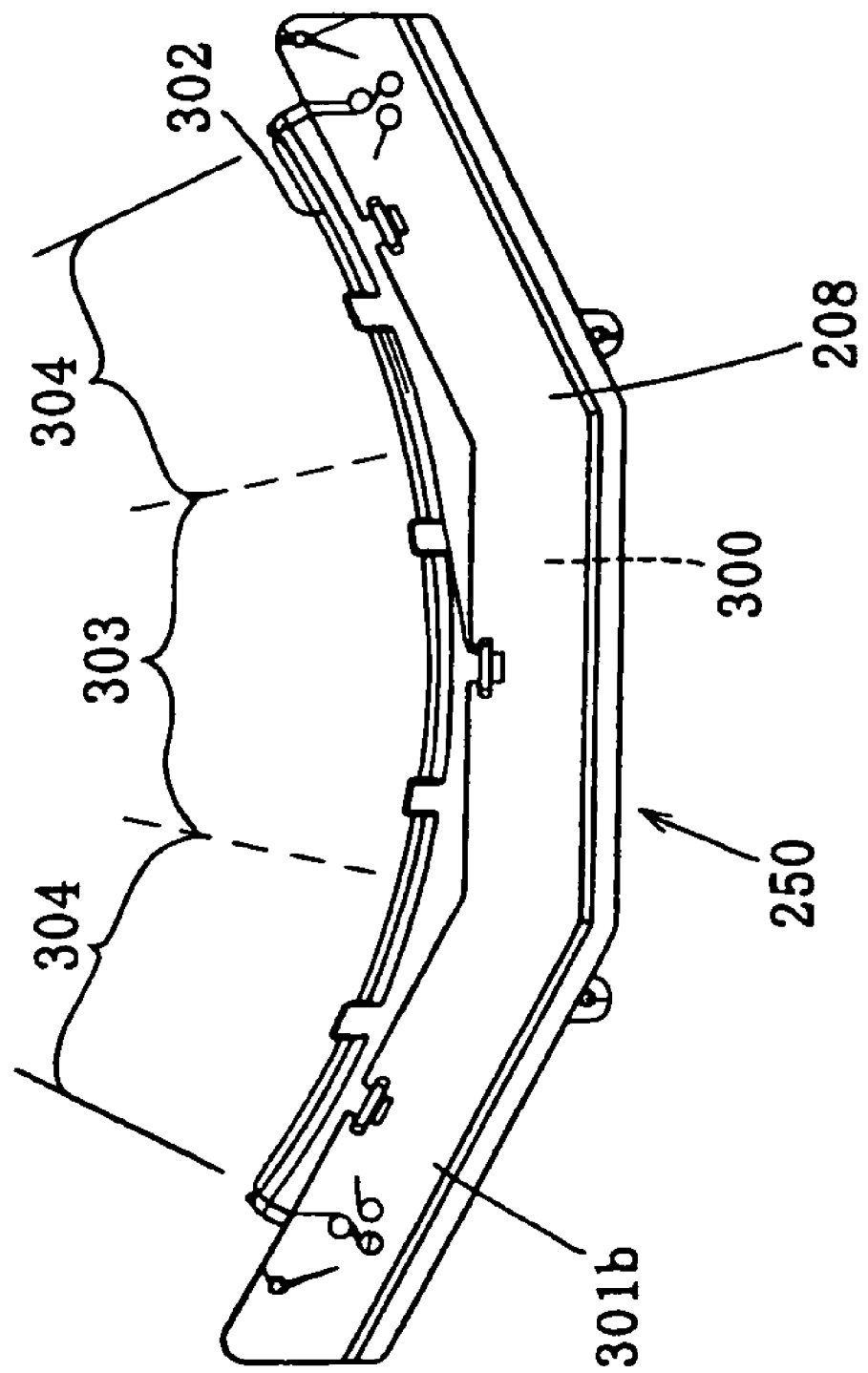
FIG. 6 is a side view of the light source body unit.
Figure 7:
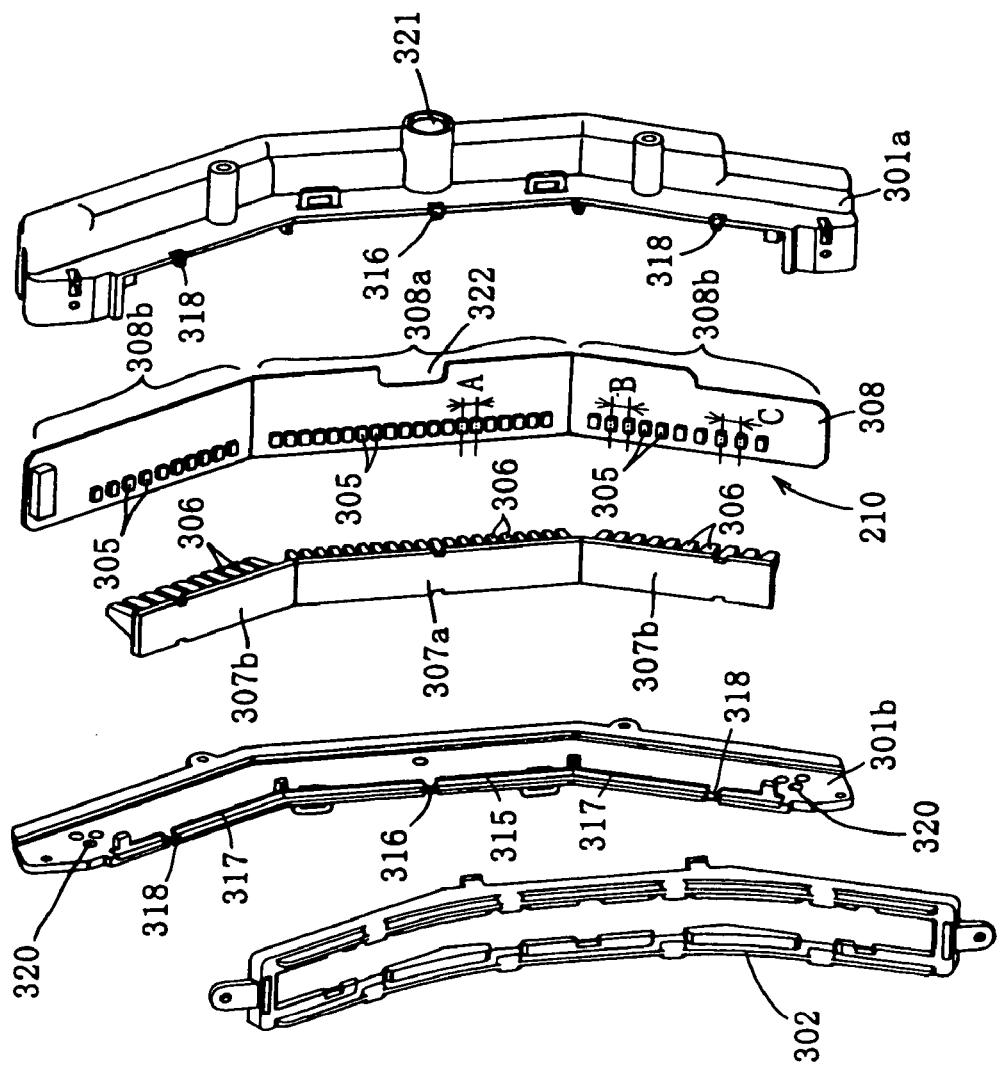
FIG. 7 is an exploded perspective view of the light source body unit.
Figure 8:
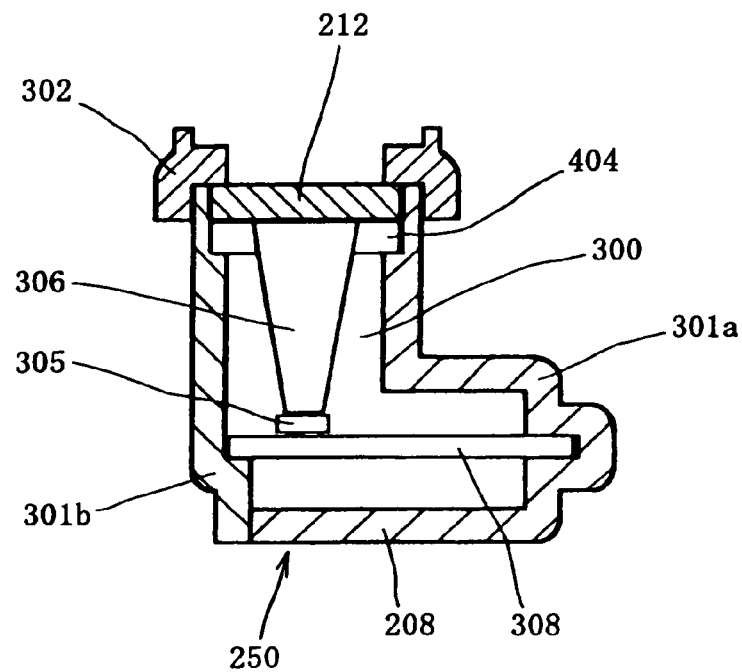
FIG. 8 is a cross-sectional view of the light source body unit.

In FIG. 5 to FIG. 7, the storage cases 301a, 301b of the holder 208 are formed with an inlet port 320 and an exhaust port 321 for air-cooling. The substrate 308 is formed of an aluminum substrate having a large surface area for ensuring good heat radiating property. By driving the air-cooling fan 222 (see FIG. 3), air sucked from the inlet port 320 flows from the peripheral portion 308b to the center portion 308a along the both surfaces of the substrate 308, and is discharged from the exhaust port 321. The center portion 308a of the substrate 308 is formed with a notch 322 at which air flowing on the both surfaces of the substrate 308 are combined on the periphery of the entrance of the exhaust port 321 for improving exhaust efficiency. Therefore, the linear light-emitting source 210 can be cooled efficiently and adequately.

Figure 10:
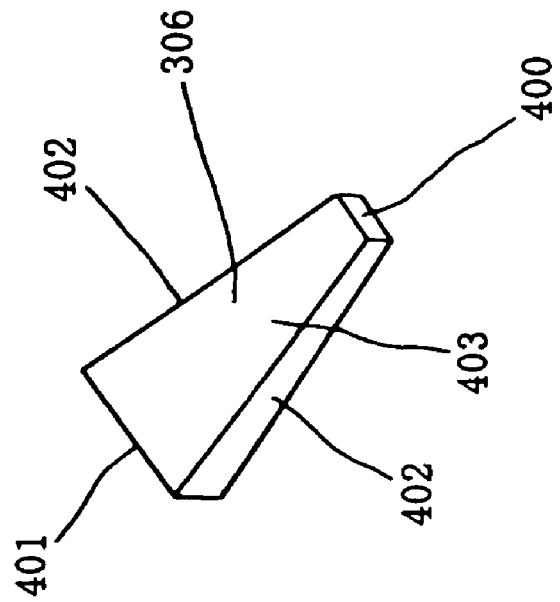
FIG. 10 is a perspective view of a prism unit.
Figure 11:
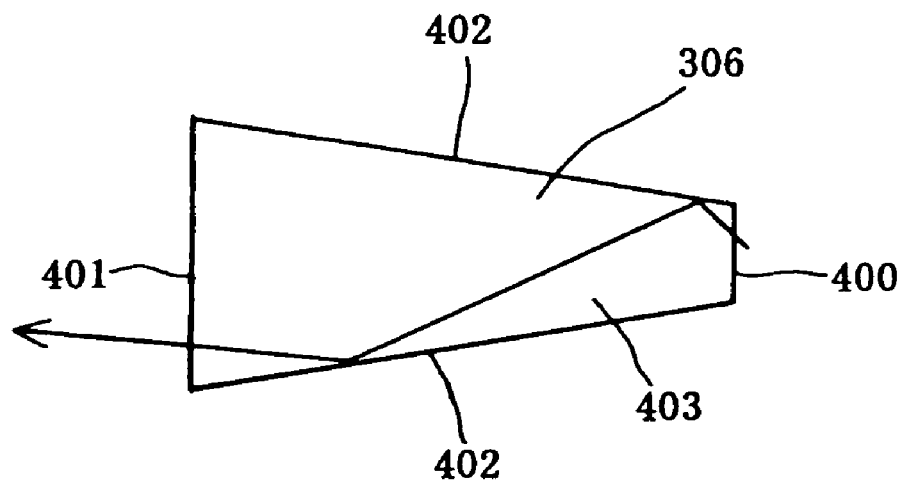
FIG. 11 is a plan view of the prism unit.
Figure 12:
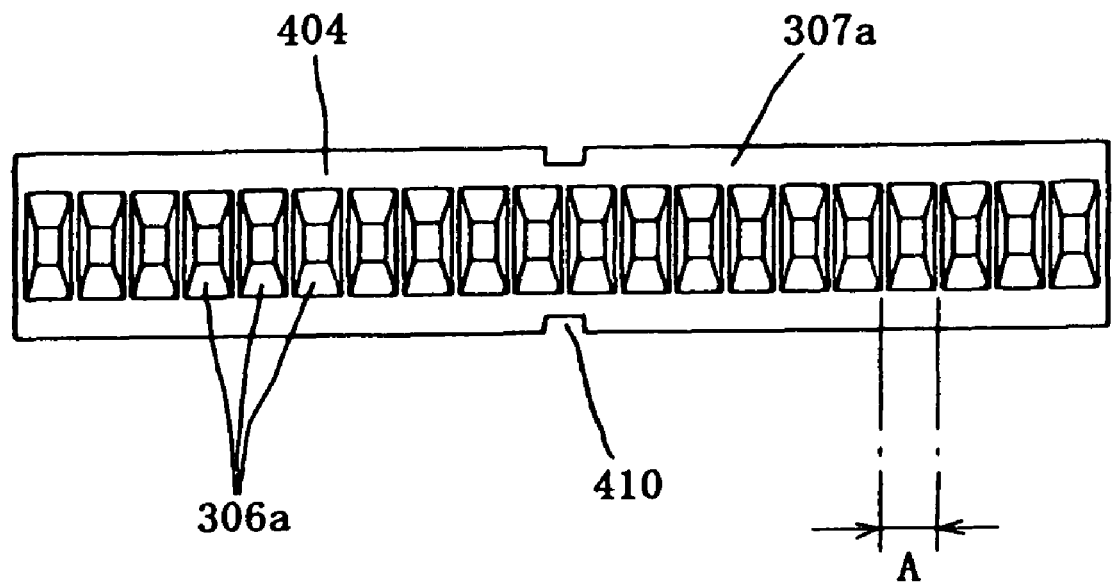
FIG. 12 is a center prism body viewed from a light-inputting surface side.
Figure 13:
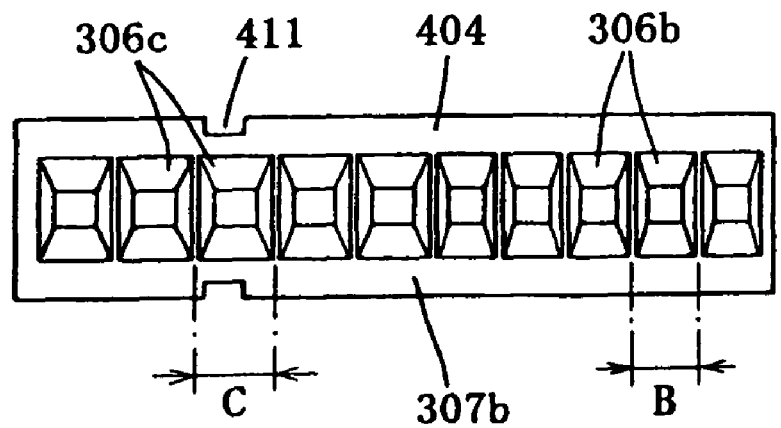
FIG. 13 is a peripheral prism body viewed from a light-inputting surface side.

FIG. 10 and FIG. 11 are a perspective view and a plan view of the prism (lens body) unit 306, FIG. 12 and FIG. 13 are drawing of the center prism body 307a, and the peripheral prism body 307b viewed from the side of the light-inputting surfaces.

The prism 306 is formed into a wedge shape so as to prevent diffusion of light from the LED 305 entered from a light-inputting surface 400 and provide directivity thereto, so that the light from a light-outputting surface 401 is emitted at a predetermined angle. The light-inputting surface 400 corresponds to the distal end of the wedge shape and the light-outputting surface 401 corresponds to the rear end of the wedge shape.

As shown in FIG. 10, the prism 306 emits light, which enters substantially straight-forward from the LED 305, from the light-outputting surface 401 as is, while the light entered at least at a predetermined angle (shown by an arrow) is totally reflected from the side surface of the prism 306 and emitted from the light-outputting surface 401 in the direction of a predetermined range of angle.

The prisms 306 include first prisms 306a used for the center prism body 307a, inner second prisms 306b and outer third prisms 306c used for the peripheral prism body 307b.

Figure 14A:
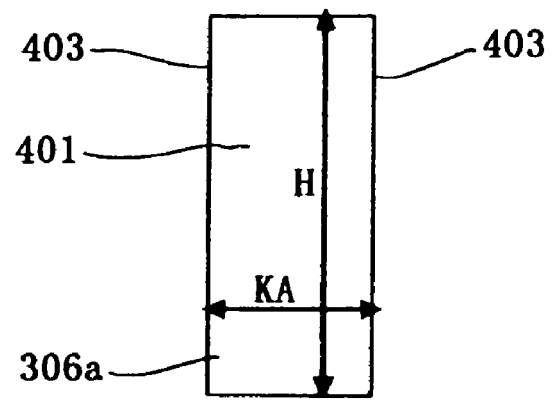
FIG. 14(a) to FIG. 14(c) are drawings showing relative dimensional relations of light-outputting surface of the prism.
Figure 14B:
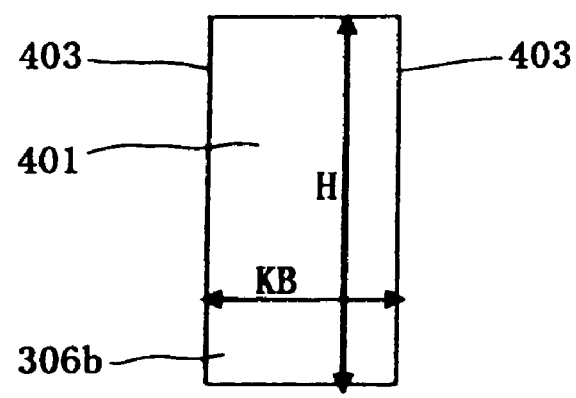
Figure 14C:
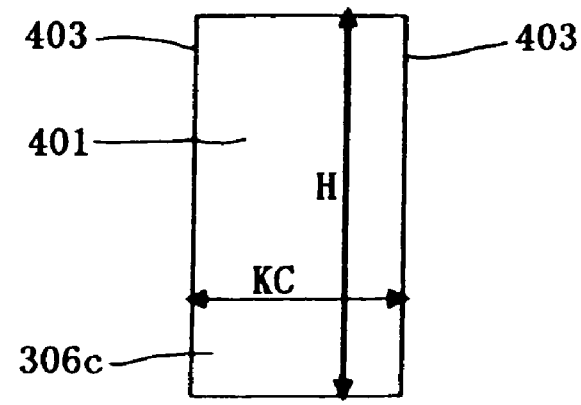

The dimensions of the respective light-inputting surfaces 400 of the first prism 306a of the center prism body 307a, the inner second prism 306b and the outer third prism 306c of the peripheral prism bodies 307b are substantially the same as or slightly larger than the dimensions of the light-emitting surface of the LED 305. The vertical (the vertical direction with respect to the liquid crystal display panel) height H of the respective light-outputting surfaces 401 of the first prisms 306a of the center prism body 307a and the inner second prisms 306b and the outer third prisms 306c of the peripheral prism bodies 307b are constant. The lateral (lateral direction with respect to the liquid crystal display panel) width KA of the light-outputting surfaces 401 of the first prisms 306a of the center prism body 307a is equal to the arrangement intervals (pitch A) of the LEDs 305 of the center portion 308a of the substrate 308, and the lateral (lateral direction with respect to the liquid crystal display panel) width KB of the light-outputting surfaces 401 of the inner second prisms 306b of the peripheral prism bodies 307b are equal to the arrangement interval (pitch B) of the inner LED 305 of the peripheral portions 308b of the substrate 308, and the lateral (lateral direction with respect to the liquid crystal display panel) width KC of the light outputting surfaces 401 of the outer third prisms 306c of the peripheral prism bodies 307b are equal to the arrangement intervals (pitch C) of the outer LEDs 305 of the peripheral portions 308b of the substrate 308. The relative dimensional relations of the respective light-outputting surfaces 401 are shown in FIG. 14 (a) to FIG. 14(c).

In other words, the light-outputting surface area of the first prism 306a of the center prism body 307a is small, and increases in sequence from the first prism 306a of the center prism body 307a, the second prism 306b, and the third prism 306c of the peripheral prism bodies 307b. Therefore, the brightness of the light outputting surface of the first prism 306a of the center prism body 307a is higher than the second prism 306b and the third prism 306c of the peripheral prism bodies 307b. In other words, the first prism 306a of the center prism body 307a narrows the irradiation range of the LED 305 of the center portion 308a, and simultaneously increases the brightness by reducing the light-outputting surface area within a range in which the throughput of the luminous flux is not lost. The second prism 306b and the third prism 306c of the peripheral prism bodies 307b are adapted to narrow the irradiating range of the LED 305 of the peripheral portion 308b, and simultaneously to secure large light-outputting surface areas.

The center prism body 307a includes a predetermined number of the first prisms 306a integrally formed respectively via peripheral portions of the light-outputting surfaces 401, and the peripheral prism bodies 307b includes predetermined numbers of the second prisms 306b and the third prisms 306c integrally formed respectively via peripheral portions of the light-outputting surfaces 401. Between the respective prisms 306a of the center prism body 307a and between the respective prisms 306b, 306c on the peripheral prism bodies 307b are formed to secure intervals except for the integrally formed portions so that the total reflection without loss is achieved in the prism.

An upper and lower peripheral portions (portions on the upper and lower sides with respect to the liquid crystal display panel) of the light-outputting surfaces 401 of the first prisms 306a on the center prism body 307a, and an upper and lower peripheral portions (portions in the upper and lower sides with respect to the liquid crystal display panel) of the light-outputting surfaces 401 of the second and third prisms 306b, 306c of the peripheral prism bodies 307b are formed with projections 404, respectively, and the center prism body 307a and the peripheral prism bodies 307b are attached to the holder 208 via the projections 404.

In this case, the projections 404 on the center prism body 307a is formed with positioning grooves 410 at the center position (with respect to the lateral direction of the prism body 307a) thereof, and the grooves 410 are to be aligned with positioning engagement devices 316 formed at the center portion of the center prism body attachment devices 315 of the storage cases 301a, 301b of the holder 208 at the time of mounting. The projections 404 on the peripheral prism bodies 307b are formed with positioning grooves 411 at positions shifted from the center (portions near the ends of the prism bodies 307b), and the grooves 411 are to be aligned with the positioning engagement devices 318 formed on the periphery of the peripheral prism body mounting devices 317 of the storage cases 301a, 301b of the holder 208 at the time of mounting.

Since the predetermined number of prisms are integrally formed, the light source unit 201 can be formed easily. Also, the prism bodies are easily attached to the holder 208 via the projections 404. Additionally, the center prism body 307a can be mounted to a predetermined mounting position of the center prism body attachment device 315 and the peripheral prism bodies 307b can be mounted to predetermined mounting positions of the peripheral prism body attachment device 317 adequately via the positioning means.

The prisms 306a, 306b, 306c are each formed in such a manner that the respective surfaces of the body portion, that is, the shape of upper and lower (with respect to the liquid crystal display panel) side surfaces 402 and the shape of a lateral (with respect to the liquid crystal display panel) side surface 403 into a linearly (planer) wedge shape. However, as shown in FIG. 15, the upper and lower (with respect to the liquid crystal display panel) side surfaces 402 may be formed into curved surfaces that are varied in curvature from the light-inputting surface 400 side to the light-outputting surface 401 side, for example, so-called Bezier curve.

Figure 15:
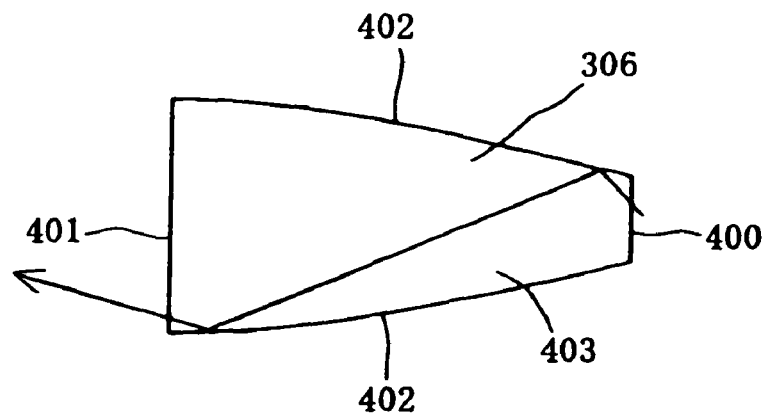
FIG. 15 is a plan view of the prism unit.

By forming the upper and lower side surfaces 402 of the prism 306 into such curved surfaces, even light which enters at relatively large incident angle in comparison with the one shown in FIG. 10 can be narrowed in outgoing range and hence emitted within the range of the liquid crystal display panel by total reflection on the side surface 402 of the prism 306 as shown in FIG. 15 and, at the same time, the light is emitted in the direction of the predetermined range of angle adequately from the light-outputting surface 401 thereby improving evenness of illumination. Therefore, diffusion of outgoing light in the vertical direction (with respect to the liquid crystal display panel) can be reduced adequately. Such a curved surface is effectively used for the side surfaces which correspond especially to the narrower sides of the liquid crystal display panel. When the lateral side surfaces 403 of the prism are linearly formed, the viewing angle can be widened in the lateral direction (with respect to the liquid crystal display panel) by the outgoing light, as well as machining such as grinding can be facilitated.

Figure 25:
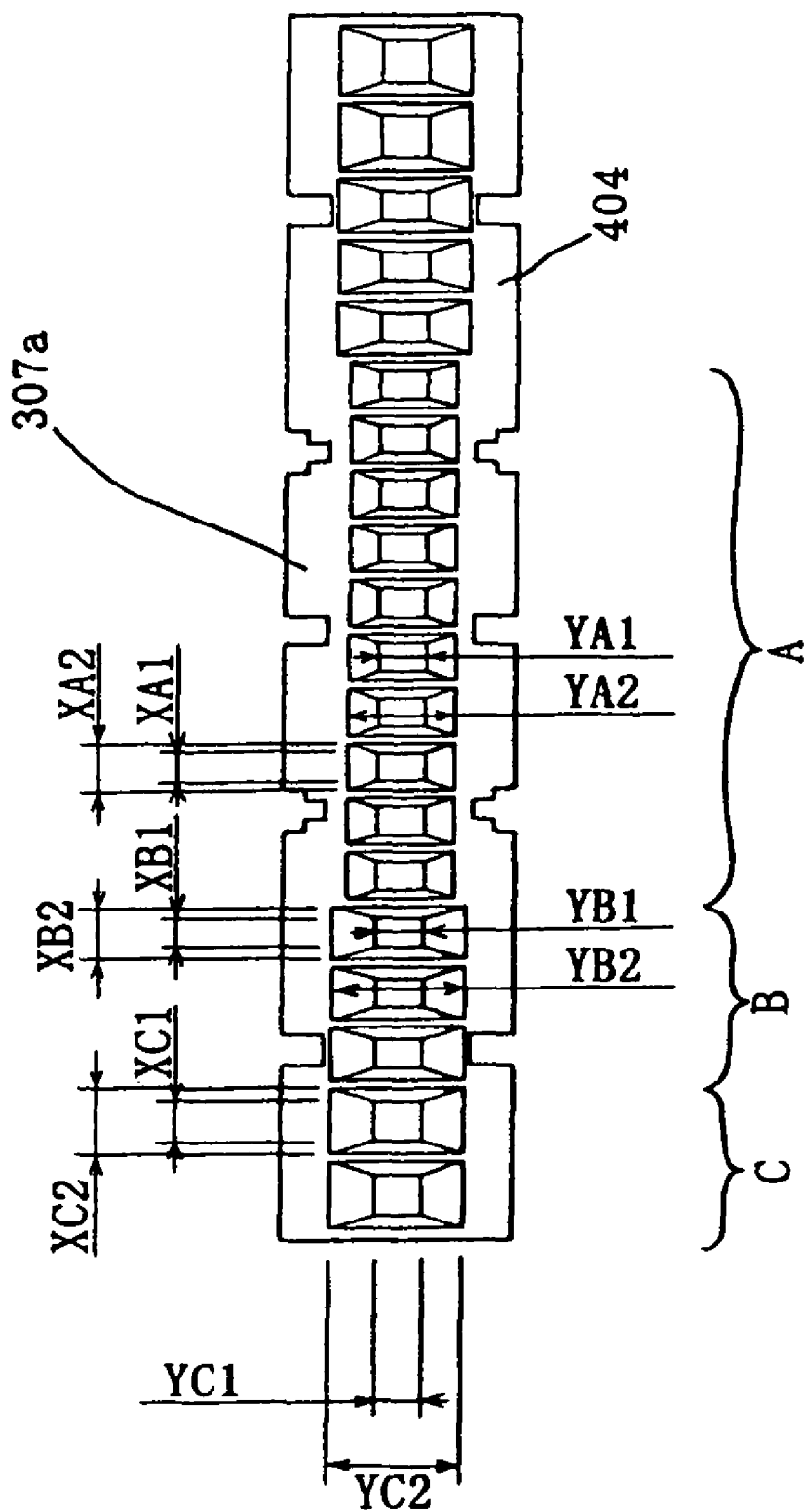
FIG. 25 is a drawing showing a modification of the center prisms body.

FIG. 25 shows a modification of the center prism body 307a. This modification is configured in such a manner that the irradiation range of the LEDs 305 at the center, which affect the three-dimensional view, out of the LEDs 305 of the light source member (center portion 308a of the substrate 308) for three-dimensional image display is reduced, and the irradiation ranges of the LEDs 305 of the peripheral portions are somewhat widened.

Where the lateral width of the light-inputting surface 400 of a prism A of the LEDs 305 at the center portion among the prisms 306a of the center prism body 307a is represented by XA1, the vertical (vertical direction with respect to the liquid crystal display panel) length is represented by YA1, the light-inputting surface area is represented by SA, the lateral (lateral direction with respect to the liquid crystal display panel) width of the light-inputting surface 400 of a prism B of the LED 305 on the inner sides of the peripheral portions is represented by XB1, the vertical (vertical direction with respect to the liquid crystal display panel) length is represented by YB1, the light-inputting surface area is represented by SB, the lateral (lateral direction with respect to the liquid crystal display panel) width of the light-inputting surface 400 of a prism C of the LED 305 on the outer sides of the peripheral portions is represented by XC1, the vertical (vertical direction with respect to the liquid display panel) length is represented by YC1, and the light-inputting surface area is represented by SC, YA1, YB1 and YC1 are equal, and the relation SA<SB<SC is satisfied. However, flexibility in size of the light-inputting surface with respect to the irradiation range is higher than the size of the light-outputting surface described later.

Where the lateral (lateral direction with respect to the liquid crystal display panel) width of the light-outputting surface 401 of the prism A of the LED 305 at the center portion is represented by XA2, the vertical (vertical direction with respect to the liquid crystal display panel) length is represented by YA2, the light-outputting surface area is represented by WA, the lateral (lateral direction with respect to the liquid crystal display panel) width of the light-outputting surface 401 of the prism B of the LED 305 on the inner sides of the peripheral portions is represented by XB2, the vertical (vertical direction with respect to the liquid crystal display panel) length is represented by YB2, the light-outputting surface area is represented by WB, the lateral (lateral direction with respect to the liquid crystal display panel) width of the light-outputting surface 401 of the prism C of the LED 305 on the outer sides of the peripheral portions is represented by XC2, the vertical (vertical direction with respect to the liquid crystal display panel) length is represented by YC2, and the light-outputting surface area is represented by WC, the values of XA2, YA2 are reduced to narrow the irradiation range of the LEDs 305 at the center portion, and simultaneously the brightness at the center portion is increased. The values of XB2, YB2, XC2, YC2 are increased to widen the light-outputting surface areas. The relations XB2<XC2, YB2=YC2, WA<WB<WC are satisfied. Generally, when the light-outputting surface area is increased, the irradiation range tends to be narrower, sometimes to such extent as to be smaller than the liquid crystal panel. In order to avoid this phenomenon, the light-outputting surface area is increased by controlling the ratio of the light-inputting and outputting surface areas or the shape of the side surfaces, so that an adequate irradiating range is simultaneously maintained.

Further, when the light-outputting surface is too large to the arrangement direction of the filter, an angle range of luminous flux entered to the filter is increased so that the luminous flux passes a pixel adjacent to the liquid crystal display panel. As a result, a cross-talk is increased.

In this case, in order to make the arrangement intervals (pitch AP) of the prism A to be small, and the arrangement intervals (pitches BP and CP) of the prism B and C to be larger in sequence, the arrangement intervals of the LEDs 305 on the center portion are set to be small, and the arrangement intervals of the LEDs 305 in the peripheral portions are to be increased in sequence. Further more, in order to maintain uniformity when viewed at various angles from the viewer side, the light-outputting surfaces of the prisms A, B, and C are preferably formed continuously.

Figure 16:
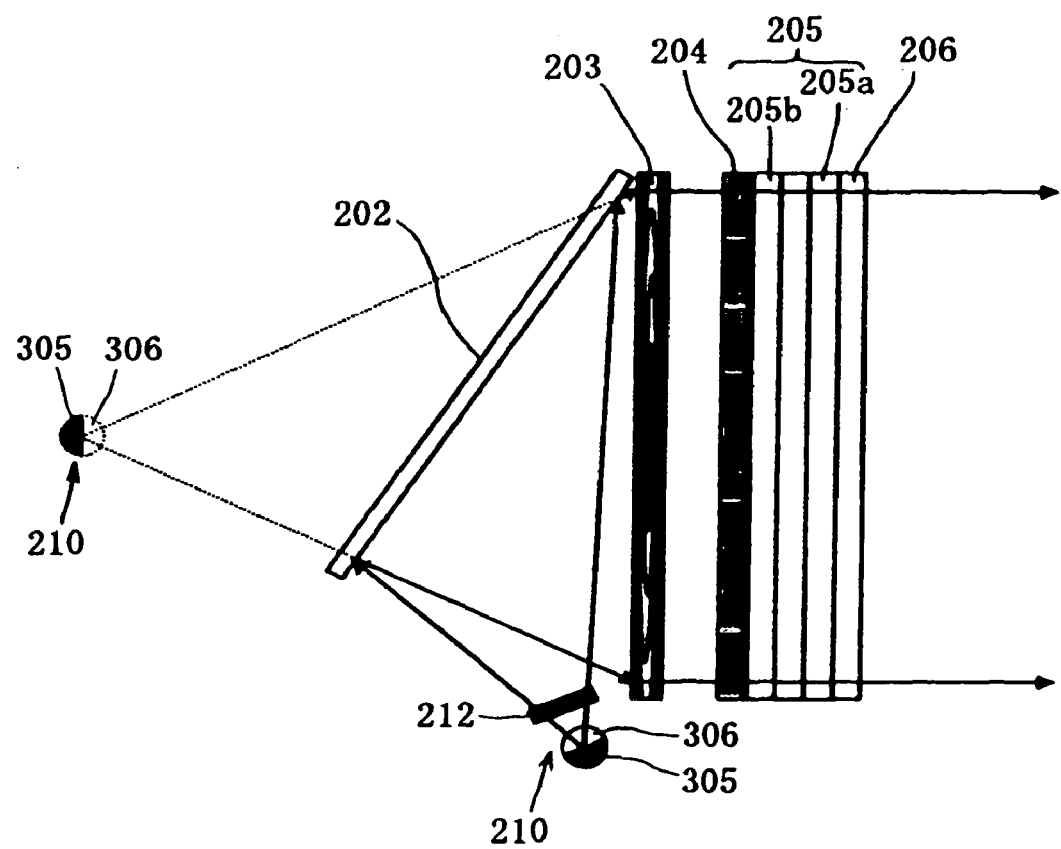
FIG. 16 is a side view of an optical system of the image display system.
Figure 17:
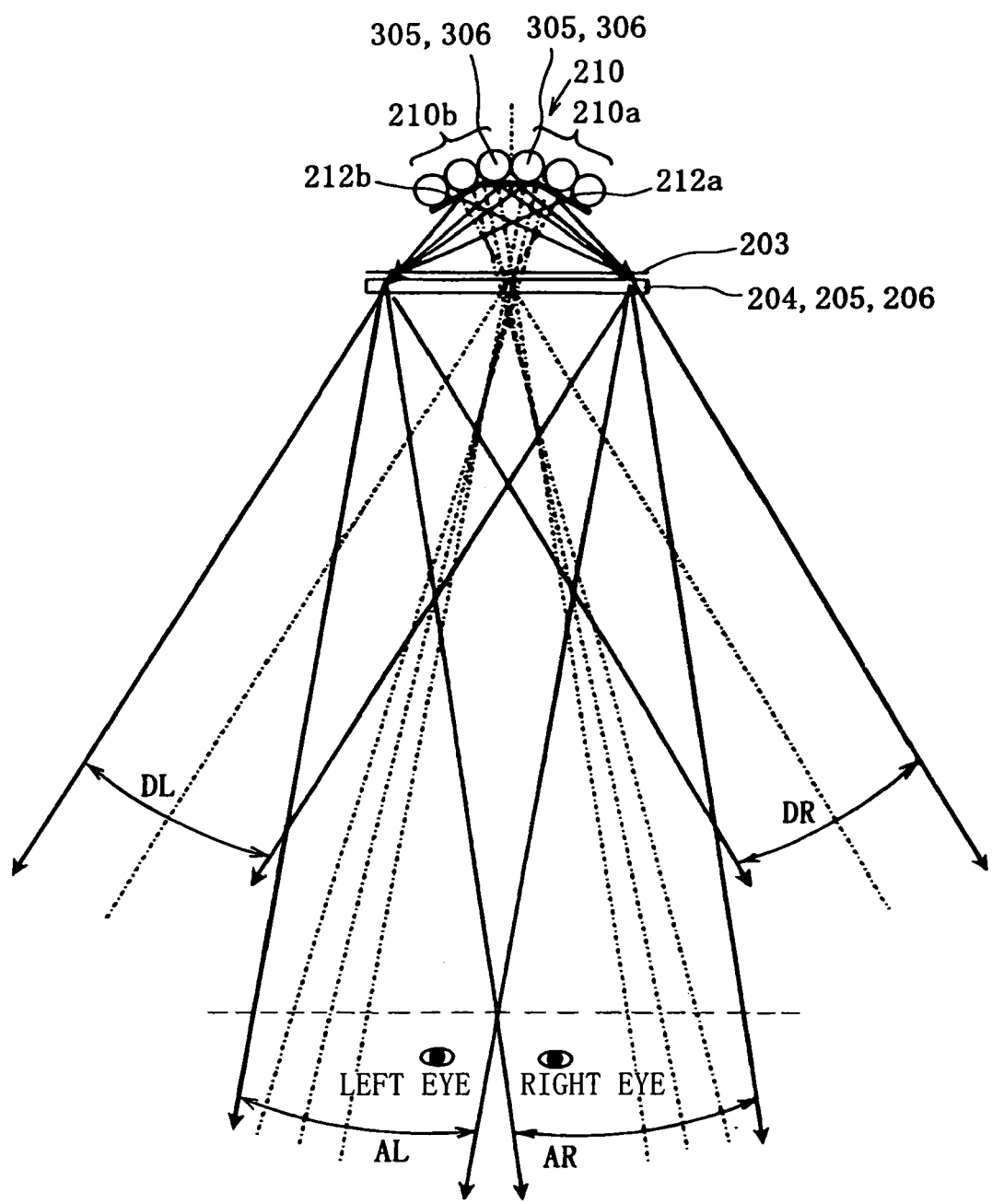
FIG. 17 is a plan view of the optical system of the image display system.

FIG. 16 and FIG. 17 are a side view and a plan view of the optical system of the image display system 200.

The case in which the plurality of point light-emitting sources (LEDs) are arranged linearly on the linear light-emitting source 210 will be described. However, the LEDs 305 and the prisms 306 of the linear light-emitting source 210 shown in FIG. 16 is only the center portion, and the LEDs 305 and the prisms 306 of the linear light-emitting source 210 shown by a dotted line is an apparent position. In FIG. 17, the reflecting plate 202 is omitted, and the LEDs 305 and the prisms 306 of the linear light-emitting source 210 are illustrated at the apparent position.

As shown in FIG. 17, lights emitted from the LEDs 305 of the left and right light-emitting portions 210a, 210b are transmitted through the polarizing filter 212 and is radially diffused. Lights emitted from the LEDs 305 of the right light-emitting portions 210a which are transmitted through the right area 212a of the polarizing filter 212 (a dashed line indicates a center of the optical path) reach the Fresnel lens 203, where the directions of travel of the lights are changed, then are transmitted through the micro-patterned retarder 204 and the liquid crystal display panel 205, and then reach the left eye zone.

Since the LEDs 305 of the right light-emitting portions 210a are arranged consecutively on the center portion (right side from the center) of the light-emitting source 210, illuminance of the light reaching the left eye zone is high. In other words, the light from the LEDs 305 of the light-emitting portion 210a on the center side reaches an AL area, and the light from the LEDs 305 of the light-emitting portion 210a adjacent thereto is emitted to an area which significantly overlaps the AL area, and hence the lights from the sequentially adjacent LEDs 305 of the light-emitting portions 210a are emitted to the areas which sequentially overlap each other. Therefore, sufficient light is irradiated on the left eye zone.

Lights emitted from the LEDs 305 of the left light-emitting portions 210b which are transmitted through the left area 212b of the polarizing filter 212 (a broken line indicates a center of the optical path) reach the Fresnel lens 203 where the directions of travel of the lights are changed, are transmitted through the micro-patterned retarder 204 and the liquid crystal display panel 205, and then reach the right eye zone.

Since the LEDs 305 of the left light-emitting portions 210b are arranged consecutively on the center portion (left side from the center) of the light-emitting source 210, the illuminance of the light reaching the right eye zone is high. In other words, the light from the LEDs 305 of the light emitting portion 210b on the center side reaches the AR area, but the light from the adjacent LEDs 305 of the light-emitting portion 210b is emitted to an area which significantly overlaps the AR area, and hence the lights from the sequentially adjacent LEDs 305 of the light-emitting portions 210b are emitted to the areas which sequentially overlap each other. Therefore, the sufficient light is irradiated on the right eye zone.

The directivity of light is enhanced by the prisms 306 of the light-emitting portions 10a, 210b on the center side, and the brightness of the light-outputting surfaces are high. Also, the density of arrangement of the LEDs 305 of the light-emitting portions 210a, 210 on the center side is high. Therefore, sufficient brightness is secured at the center portion, that is, in front of the center portion of the liquid crystal display panel 205.

The liquid crystal display panel 205 substantially equalizes the pitch of the scanning lines of the liquid crystal display panel 205 and the repeating pitch of the polarization characteristics on the micro-patterned retarder 204, and the lights coming from the different directions are irradiated on each pitch of the scanning lines of the liquid crystal display panel 205 and hence the lights are emitted in the different directions.

Lights emitted from the LEDs 305 of the right light-emitting portions 210a and transmitted through the right area 212a of the polarizing filter 212 pass through the Fresnel lens 203, reach the micro-patterned retarder 204, pass through the areas 204a of the micro-patterned retarder 204, where the polarization is turned by 90 degrees before emission (light transmitted through the right area 212a is transmitted), and then pass through the liquid crystal display panel 205, and reach the left eye zone. In other words, left-eye images displayed by the display devices at positions corresponding to the areas 204a of the liquid crystal display panel 205 reach the left eye.

Since the areas 204b which are arranged alternately with the areas 204a of the micro-patterned retarder 204 do not change the polarization of light, the lights from the right area 212a of the polarizing filter 212 do not pass through the polarizer 205a of the liquid crystal display panel 205, that is, the display devices (which display the right-eye images) at positions corresponding to the areas 204b of the liquid crystal display panel 205.

The lights emitted from the LEDs 305 of the left light-emitting portions 210b and transmitted through the left area 212b of the polarizing filter 212 pass through the Fresnel lens 203, reach the micro-patterned retarder 204, pass through the areas 204b of the micro-patterned retarder 204 which allow the light of the same polarization as the left area 212b of the polarizing filter 212, pass through the liquid crystal display panel 205 and reach the right eye zone. In other words, the right-eye images displayed by the display devices at positions corresponding to the areas 204b of the liquid crystal display panel 205 reach the right eye.

Since the areas 204a arranged alternately with the areas 204b of the micro-patterned retarder 204 change the polarization of light, the lights from the left area 212b of the polarizing filter 212 do not pass through the display devices (which display the left-eye images) at positions corresponding to the polarizer 205a of the liquid crystal display panel 205, that is, the areas 204a of the liquid crystal display panel 205.

Also, since the linear light-emitting source 210 including the plurality of LEDs 305 arranged linearly is disposed in the lateral direction with respect to the liquid crystal display panel 205, bright images can be provided.

Although cross-talk caused by passage of luminous flux through the pixel corresponding to the above-described filter and adjacent pixel or overlap of the right-eye image and the left-eye image due to birefringence or radio scattering on the Fresnel lens 203 or the liquid crystal display panel 205 may be generated, since the linear light-emitting source 210 is arranged in the lateral direction, the cross-talk can be reduced.

As described above, the sufficient light is irradiated to the left eye zone and the right eye zone by the right light-emitting portion 210a and the left light-emitting portion 210b of the linear light-emitting source 210. In other words, the left-eye image having sufficient brightness reaches the left eye zone, while the right-eye image having sufficient brightness reaches the right eye zone. Therefore, even when the right-eye image enters the left eye, or the left-eye image enters the right eye due to the birefringence or radio scattering on the Fresnel lens 203 or the liquid crystal display panel 205, the difference in brightness from the left-eye image which reaches the left eye, or the difference in brightness from the right-eye image which reaches the right eye, relatively increases, and hence the cross-talk can be sufficiently reduced. Particularly, since sufficient brightness can be secured in front of the center portion of the liquid crystal display panel 205, cross talk can further be reduced.

Therefore, the viewer can easily recognize the three-dimensional image by the right-eye image and the left-eye image, and hence three-dimensional view can be easily achieved by the three-dimensional perception based on the parallax of both eyes.

Lights from the light-emitting portions 210a disposed around the right periphery of the linear light-emitting source 210 are emitted to the left side of the left-eye zone at a wide angle (DL area), and lights from the light-emitting portions 210b disposed on the left periphery of the linear light-emitting source 210 are emitted to the right side of the right eye zone at a wide angle (DR area).

Therefore, the viewing angle of the image display system increases. Therefore, when TV-game or the like is played with this image display system, or when this image display system is used as an image display system for displaying a game machine (such as a pinball machine), the image can be viewed preferably not only by the player, but also many persons around the player.

When the linear light-emitting source 210 is formed of the cold-cathode tube or the like, the density of the light emitting portions of the center side and the peripheral portions may be the same. However, the screen which is bright to the same extend can be obtained, the cross-talk can be sufficiently reduced, and the viewing angle is increased.

Figure 18:
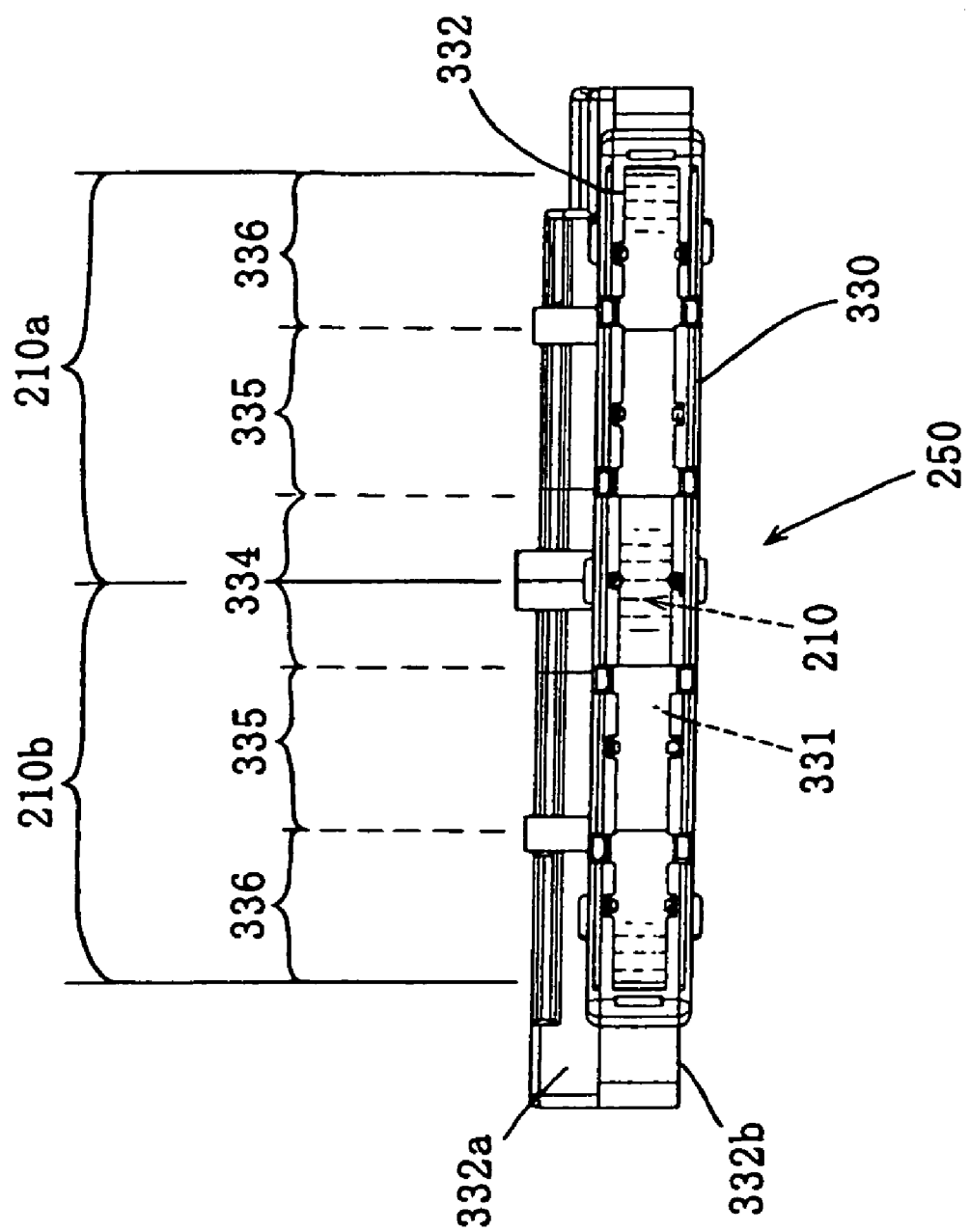
FIG. 18 is a front view of the light source body unit according to a second embodiment.
Figure 19:
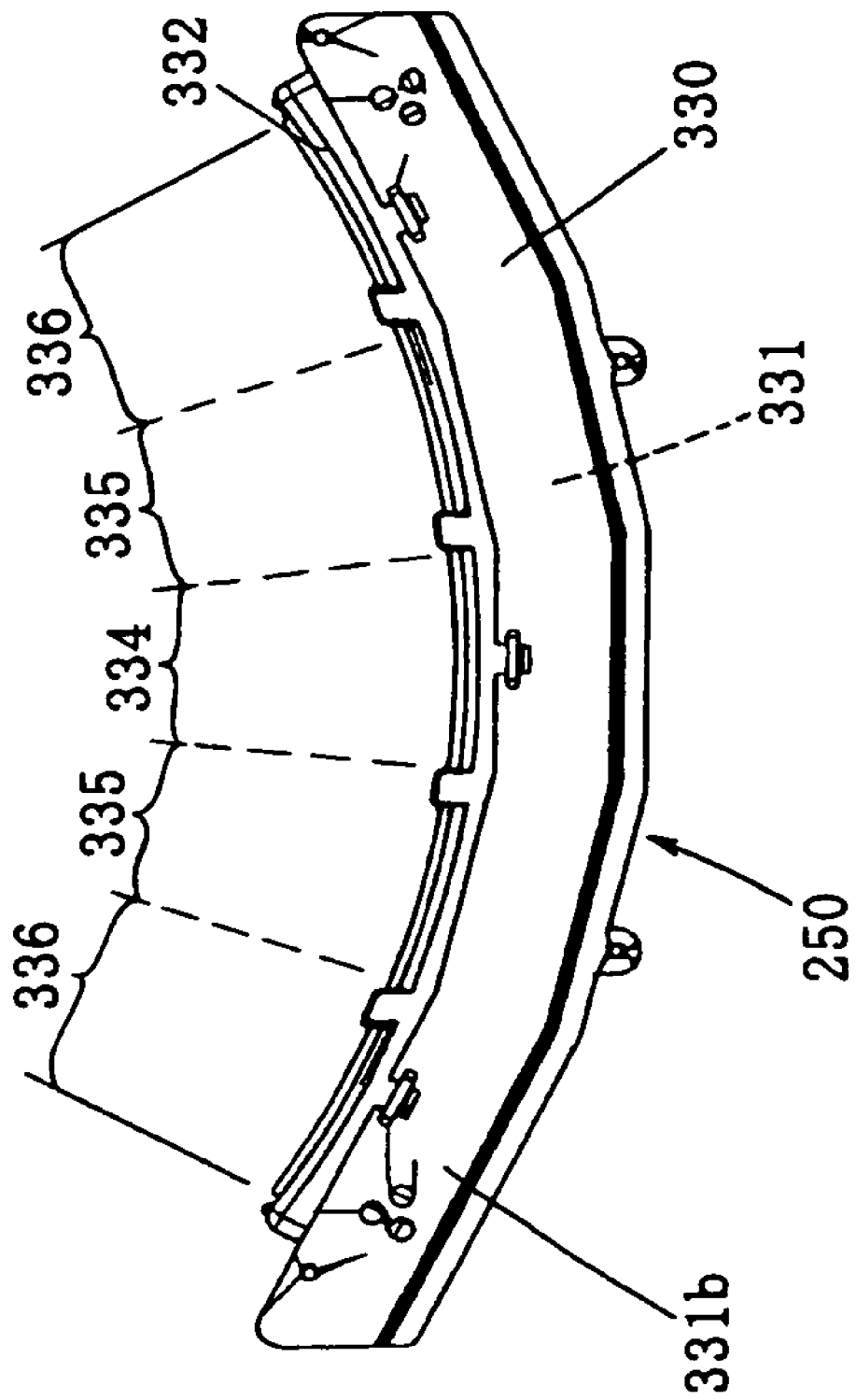
FIG. 19 is a side view of the light source body unit.
Figure 20:
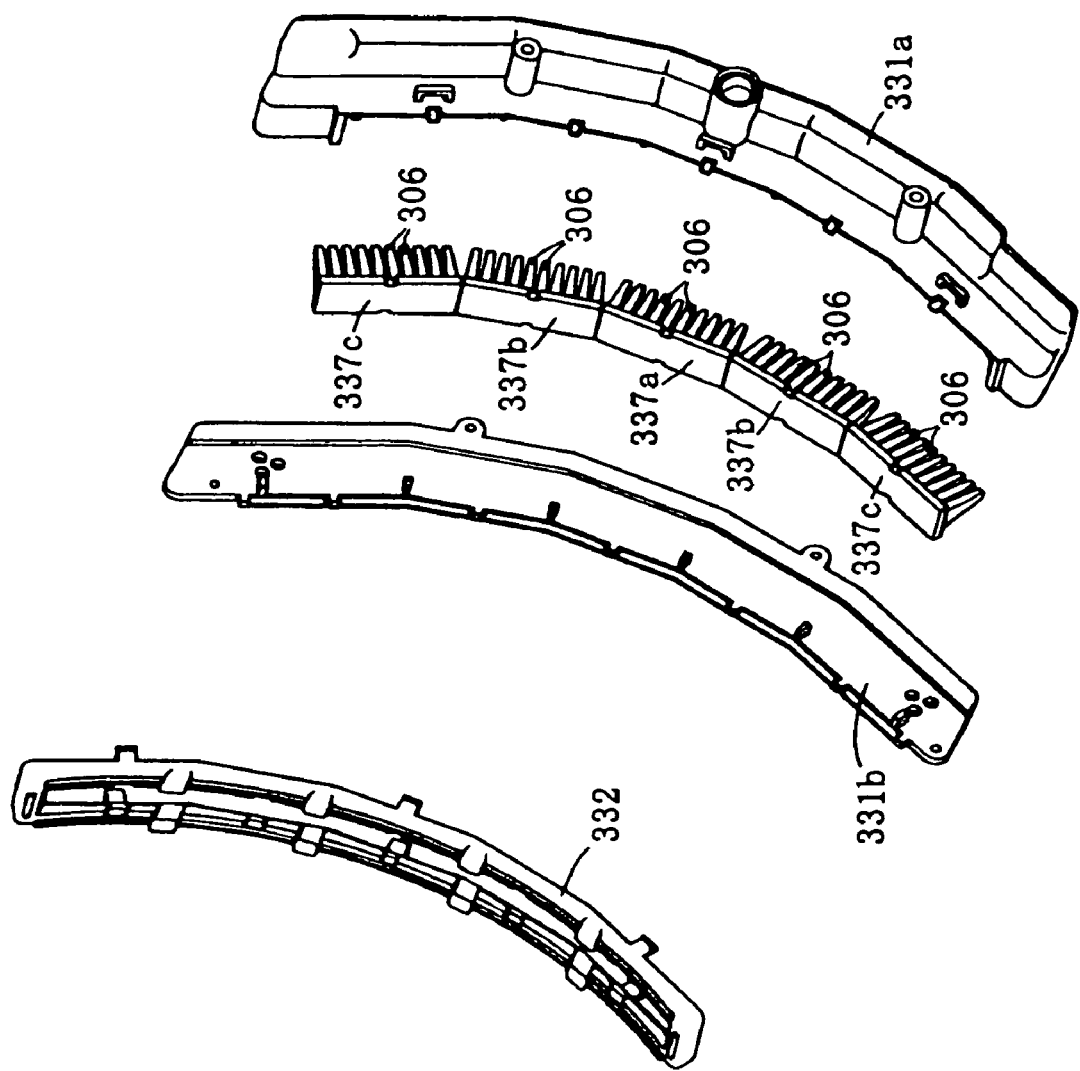
FIG. 20 is an exploded perspective view of the light source body unit.

FIG. 18 to FIG. 20 are a plan view, a side view, and an exploded perspective view of the light source body unit 250 according to another embodiment. The linear light-emitting source 210 is composed of a plurality of linearly arranged point light-emitting sources (LEDs (light-emitting diodes): white light-emitting diode or the like) or elongated cold-cathode tube or the like. In this embodiment, a case in which the point light-emitting sources are employed will be described.

A holder 330 includes storage cases 332a, 332b and a cover 333 having divided structure forming a storage 331 into the shape of a polygonal line, and the storage 331 includes a center portion 334 of a predetermined length, intermediate portions 335 disposed on the both sides thereof so as to be inclined by a predetermined angle toward the front of the holder, and peripheral portions 336 disposed on the both sides thereof so as to be inclined by a predetermined angle toward the front of the holder.

The linear light-emitting source 210 includes a predetermined number of LEDs (light-emitting diodes: white light-emitting diode or the like) 305 which are linearly arranged and mounted to the substrate (not shown) at the center portion of a predetermined length, the intermediate portions disposed on the both sides thereof so as to incline by a predetermined angle toward the front surface of the substrate, and the peripheral portions disposed on the both sides thereof so as to incline by a predetermined angle toward the front of the holder.

The respective LEDs 305 are arranged in such a manner that the arrangement intervals (pitch A) of the LEDs 305 at the center of the substrate are small, the arrangement intervals (pitch B) of the LEDs 305 on the intermediate portions are slightly larger than the LEDs 305 on the center portion, and the arrangement intervals (pitch C) of the LEDs 305 of the peripheral portions are still slightly larger than the LEDs 305 of the intermediate portions.

On the front surfaces of the respective LEDs 305, there are provided prisms 306 for providing directivity to the lights from the LEDs 305 in one-to-one relation. The respective prisms 306 are formed in such a manner that the prisms 306 on the center portion are integrally formed as the center prism body 307a, the prisms 306 on the intermediate portions are integrally formed as the intermediate prism bodies 307b, and the prisms 306 on the peripheral portions are integrally formed as the peripheral prism bodies 307c corresponding to the LEDs 305 of the center portion 308a, the LEDs 305 of the intermediate portions, and the LEDs 305 of the peripheral portions 308b, and the light-inputting surfaces for allowing the lights from the LEDs 305 to enter and the light-outputting surfaces for causing the lights entered from the light-inputting surfaces and corrected in the optical path to be emitted are provided in one-to-one relation with respect to the respective LEDs 305.

As shown in previously described FIG. 10, FIG. 11 or FIG. 15, the prisms 306 are formed into a wedge shape in order to prevent diffusion of the lights from the LEDs 305, provide directivity, and cause the lights to be emitted at a predetermined angle, and include the first prisms 306a used for the center prism body 337a, the second prisms 306b used for the intermediate prism bodies 337b, and the third prisms 306c used for the peripheral prism bodies 337c.

The light-outputting surface areas of the first prisms 306a of the center prism body 337a is small, and is adapted to increase in sequence in the order from the first prisms 306a of the center prism body 337a, the second prisms 306b of the intermediate prism bodies 337b, and the third prisms 306c of the peripheral prism bodies 337c.

The substrate on which the LEDs 305 are arranged is stored in the storage cases 332a, 332b of the holder 330 and assembled so that the center prism body 337a is aligned with the LEDs 305 of the center portion, the intermediate prism bodies 307b are aligned with the LEDs 305 of the intermediate portions, and the peripheral prism bodies 307c are aligned with the LEDs 305 of the peripheral portions (so that the light-emitting surfaces of the LEDs 305 and the light-inputting surfaces of the respective prisms 306 are aligned in one-to-one relation), and then the polarizing filter 212 is mounted to the front surfaces of the respective prism bodies 307a, 307b, and 307c via the covers 333, whereby the light source body unit 250 is formed.

The linear light-emitting source 210 is formed into the shape of the symmetrical polygonal line and the center prism body 307a, the intermediate prism bodies 307b, and the peripheral prism bodies 307c are formed so that the light-outputting surfaces of the prisms curve toward the center of the liquid crystal display panel 205.

Although the linear light-emitting source 210 is formed on a single substrate, the linear light-emitting source 210 may be configured by dividing the substrate into a substrate of the center portion, substrates of the intermediate portions, and substrates of the peripheral portions, then arranging the LEDs 305 linearly on the respective substrates to form units respectively, and then disposing the plurality of linear light-emitting source units in the shape of the polygonal line.

In this arrangement, the linear light-emitting portions of the linear light-emitting source 210 can be arranged so as to curve toward the center portion of the Fresnel lens 203 (so as to be positioned substantially at the uniform distance) in comparison with the mode described above. The main object of the Fresnel lens 203 is to converge a luminous flux from the LEDs 305 at the center portion to positions of the eyes of the viewer, secure the field of view, and separate the left and right areas which enable three-dimensional view at the viewing position effectively. When the shape of the Fresnel lens 203 is set in this manner, the converging properties of the luminous flux, which is incident from the peripheral portions of the linear light-emitting source 210, is deteriorated, which may be a cause of deterioration of efficiency of usage of light. Since one of the causes of the deterioration of the converging properties is curvature of image surface of the Fresnel lens 203, the curved arrangement as described above may help to correct the deterioration. The extent of curvature need not completely coincide with the curvature of the image surface, and may be set as needed considering conveniences in arrangement or manufacture.

Therefore, unevenness of brightness in the left-eye zone and the right-eye zone can be reduced sufficiently, and effective usage of light is achieved, whereby further easier recognition of the three-dimensional image is achieved.

Figure 21:
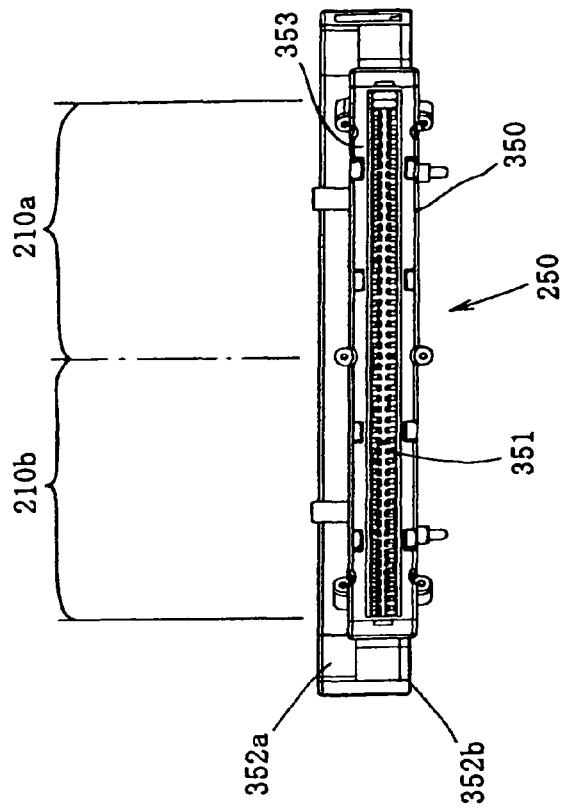
FIG. 21 is a front view of the light source body unit according to a third embodiment.
Figure 22:
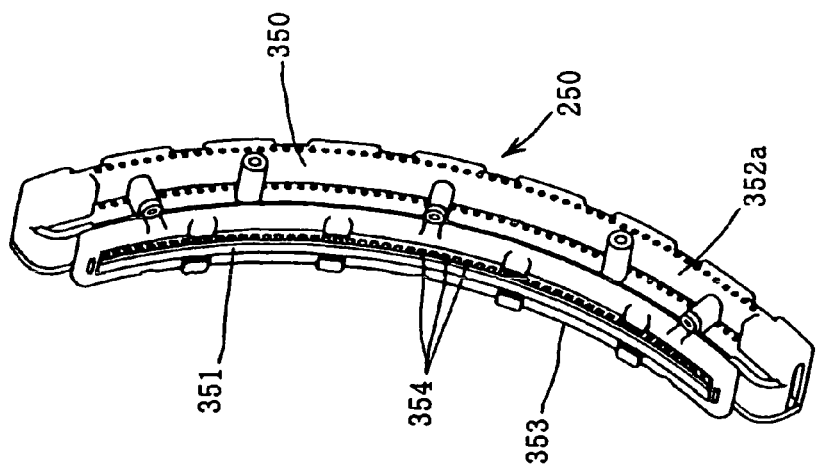
FIG. 22 is a perspective view of the light source body unit.
Figure 23:
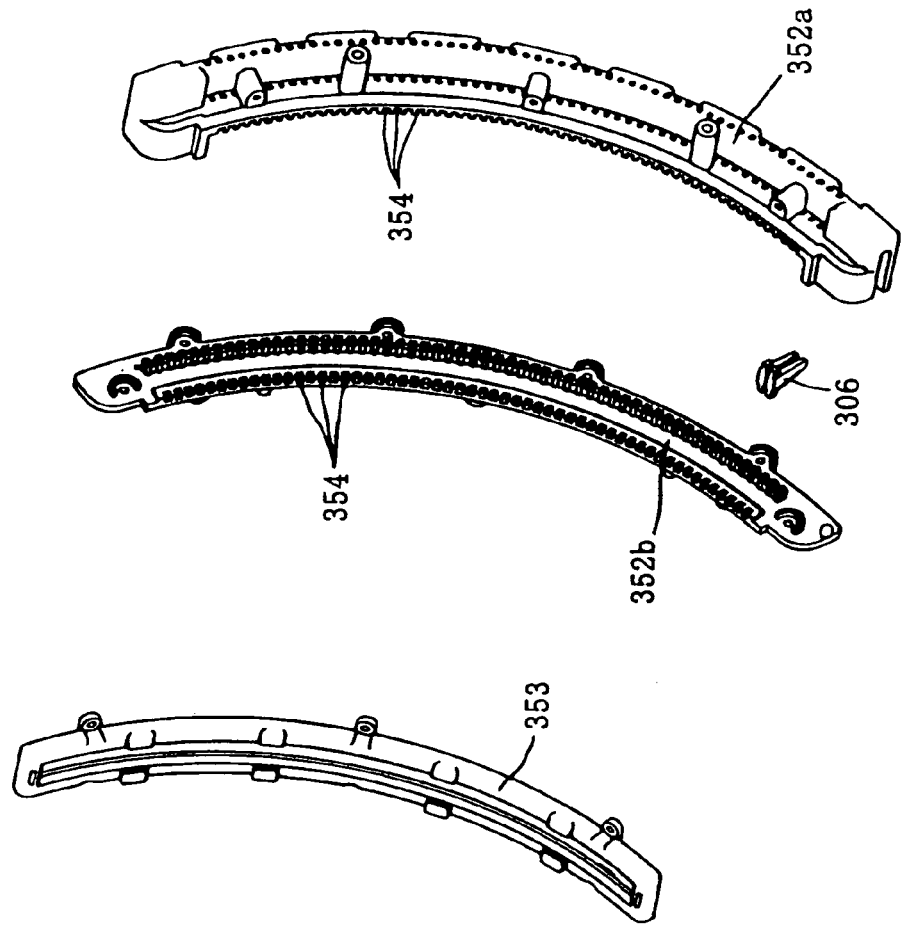
FIG. 23 is an exploded perspective view of the light source.

FIG. 21 to FIG. 23 are a plan view, a perspective view, and an exploded perspective view of the light source body unit 250 according to another embodiment. The linear light-emitting source 210 is formed of the plurality of point light-emitting sources arranged linearly (LEDs (light-emitting diodes): white light-emitting diode or the like) or an elongated cold cathode tube or the like, and in this embodiment, the case in which the point light-emitting sources are used will be described.

A holder 350 includes storage cases 352a, 352b and a cover 353 having divided structures, and the storage cases 352a, 352b and the cover 353 form a storage 351 of an arcuate shape (shape of a curved line) of a predetermined curvature (the radius is equal to the focal distance of the Fresnel lens 203 in this case).

The linear light-emitting source 210 is formed by arranging linearly and mounting a predetermined number of LEDs (light-emitting diodes: white light-emitting diode or the like) 305 onto a substrate (not shown) formed by bending into an arcuate shape (shape of a curved line) of a predetermined curvature (the radius is equal to the focal distance of the Fresnel lens 203).

The respective LEDs 305 are arranged at regular intervals, and the prisms 306 for providing directivity to the lights from the LEDs 305 are arranged on the front surface of the respective LEDs 305 respectively in one-to-one relation with respect to the LEDs 305.

Figure 24:
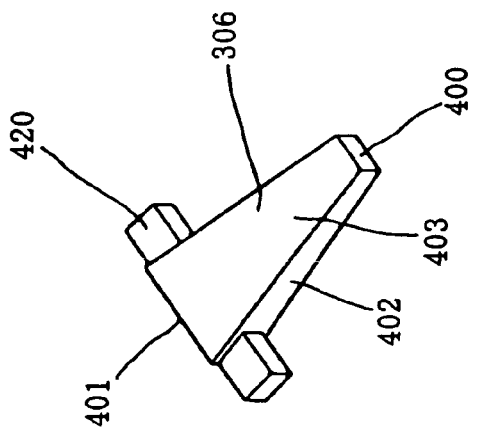
FIG. 24 is a perspective view of the prism unit.

As shown in previously described FIG. 10, FIG. 11 or FIG. 15, the prisms 306 are formed into a wedge shape in order to prevent diffusion of the lights from the LEDs 305, and provide directivity to cause the lights to be emitted with diffusion at a predetermined angle. An upper and lower peripheral portions (portions on the upper and lower sides with respect to the liquid crystal display panel) of the light-outputting surfaces 401 of the prisms 306 are formed with mounting projections 420 as shown in FIG. 24.

The substrate on which the LEDs 305 are arranged is stored in the storage cases 352a, 352b of the holder 350, the prisms 306 are fitted to receiving grooves 354 formed at front edges of the storage cases 352a, 352b respectively to align with the LEDs 305. Then, the polarizing filter 212 (not sown) is mounted to the front surfaces of the respective prisms 306 via the cover 353, whereby the light source body unit 250 is formed.

Accordingly, the linear light-emitting source 210 can be arranged in symmetrical curved shape so that the light outputting surface of the respective prisms 306 is located at a substantially uniform distance from the center of the liquid crystal display panel 205 (so as to curve).

In this arrangement, the linear light-emitting source 210 and the viewer can be positioned substantially at conjugate position so that the linear light-emitting portion of the linear light-emitting source 210 can be positioned at a uniform distance from the center of the Fresnel lens 203.

Therefore, unevenness of brightness in the left-eye zone and the right-eye zone can be eliminated reliably, whereby further easier recognition of the three-dimensional image is achieved.

The prisms 306 may be those being different in shape, such as light-outputting surface area or the like corresponding to the LEDs 305 of the center portion of the substrate, the LEDs 30 of the intermediate portions, and LEDs 305 of the peripheral portions as in the above-described mode.

In the respective embodiments described above, the linear light-emitting sources 210 including the plurality of point light-emitting sources (LEDs (light-emitting diodes): white light-emitting diode and the like) arranged linearly thereon has been described. However, it is also possible to employ the cold cathode tube or the like, and in this case, the elongated cold cathode tube or the like may be formed into the shape of polygonal line or a predetermined arcuate shape (curved shape).

The embodiments disclosed here are shown as examples only, and are not intended to limit the invention. The scope of the present invention is not limited by the description shown above, but by claims, and is intended to include all the modifications having equivalent meanings to the claims without departing the scope of the invention.

The invention claimed is:

1. An image display system comprising:
    a liquid crystal display panel;
    a light source which emits light having a first polarization and light having a second polarization, orthogonal to the first polarization, onto the liquid crystal display panel,
    a filter, disposed between the liquid crystal display panel and the light source, comprising:
        first areas which transmit light having the first polarization and second areas which transmit light having the second polarization, wherein the first and second areas are disposed repeatedly, and alternate in a vertical direction;
    wherein the light source comprises:
        a light emitting source which emits light,
        polarizing means which polarizes light emitted from the light emitting source into light having the first polarization and light having the second polarization,
        optical means which refracts the light having the first polarization in a different direction than the light having the second polarization,
    wherein the light-emitting source is a linear light-emitting source which is disposed in a substantially horizontal direction with respect to the liquid crystal display panel, and comprises peripheral portions and a center portion therebetween;
    wherein the linear light-emitting source comprises
        a plurality of center prisms, disposed in the center portion, and
        a plurality of peripheral prisms, disposed in the peripheral portions,
        wherein the center prisms focus light passing therethrough to a greater degree than the peripheral prisms; and
        wherein the center prisms and the peripheral prisms each include a light-inputting surface which receives light from a point light-emitting source and a light-outputting surface opposite the light-inputting surface.

2. The image display system according to claim 1, wherein the linear light-emitting source comprises a plurality of linearly disposed point light-emitting sources disposed in the peripheral and center portions, such that there is a one-to-one correspondence between point light-emitting sources and center prisms in the center portion and a one-to-one correspondence between point light-emitting sources and peripheral prisms in the peripheral portions.

3. The image display system according to claim 2, wherein the center prisms and the peripheral prisms are disposed with substantially no gaps therebetween.

4. The image display system according to claim 2, wherein the center prisms are formed of a single, integral body, and the peripheral prisms are formed as two integral bodies on each side of the integral body of the center prisms.

5. The image display system according to one of claims 2, 3, and 4, wherein:
    a density of the point light-emitting sources in the center portion is greater than a density of the linear light-emitting sources in the peripheral portions.

6. The image display system according to claim 5, wherein:
    each of the center prisms and the peripheral prisms comprises a wedge shaped prisms, each comprising
        the light-inputting surface,
        the light-outputting surface, first opposing side surfaces and
        curved second opposing side surfaces.

7. The image display system according to claim 6, wherein the first opposing side surfaces are substantially planar.

8. The image display system according to claim 5, wherein:
    the light-outputting surfaces of the center prisms and the light-outputting surfaces of the peripheral prisms are positioned at a substantially uniform distance from a center of the liquid crystal display panel.

9. The image display system according to one of claims 2, 3, and 4, wherein:
    each of the center prisms and the peripheral prisms comprises a wedge shaped prisms, each comprising
        the light-inputting surface,
        the light-outputting surface,
        first opposing side surfaces and
        curved second opposing side surfaces.

10. The image display system according to claim 9, wherein the first opposing side surfaces are substantially planar.

11. The image display system according to one of claims 1, 2, 3, and 4, wherein
    the light-outputting surfaces of the center prisms and the light-outputting surfaces of the peripheral prisms are positioned at a substantially uniform distance from a center of the liquid crystal display panel.

* * * * *